US012793238B2

(12) United States Patent
Higgins et al.

(10) Patent No.: US 12,793,238 B2
(45) Date of Patent: Nov. 10, 2026

(54) UNIVERSAL TRACKING MODULE

(71) Applicant: Meta Platforms Technologies, LLC, Menlo Park, CA (US)

(72) Inventors: Jason Andrew Higgins, Seattle, WA (US); Lorenz Henric Jentz, Seattle, WA (US); Nicholas Friele Everist, Seattle, WA (US); Khaled Boulos, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 19/358,961

(22) Filed: Oct. 15, 2025

(65) Prior Publication Data

US 2026/0094284 A1 Apr. 2, 2026

Related U.S. Application Data

(62) Division of application No. 18/351,026, filed on Jul. 12, 2023, now Pat. No. 12,475,577.

(51) Int. Cl.

| | |
|---|---|
| ***G09G 5/00*** | (2006.01) |
| ***G06F 3/01*** | (2006.01) |
| ***G06F 3/03*** | (2006.01) |
| ***G06F 3/0354*** | (2013.01) |
| ***G06T 7/11*** | (2017.01) |
| ***G06T 7/246*** | (2017.01) |
| ***G06T 7/73*** | (2017.01) |
| ***G06T 19/00*** | (2011.01) |

(52) U.S. Cl.

CPC .............. *G06T 7/248* (2017.01); *G06F 3/012* (2013.01); *G06F 3/016* (2013.01); *G06F 3/0308* (2013.01); *G06F 3/0354* (2013.01); *G06T 7/11* (2017.01); *G06T 7/74* (2017.01); *G06T 19/00* (2013.01); *G06T 2200/24* (2013.01); *G06T 2207/20021* (2013.01); *G06T 2207/20081* (2013.01)

(58) Field of Classification Search

CPC .............. G06T 7/248; G06T 7/74; G06T 7/11

USPC .......................................................... 345/156

See application file for complete search history.

(56) References Cited

U.S. PATENT DOCUMENTS

| | | | | |
|---|---|---|---|---|
| 2006/0082546 | A1* | 4/2006 | Wey | G06F 3/0325 345/156 |
| 2016/0232715 | A1 | 8/2016 | Lee | |
| 2018/0285636 | A1 | 10/2018 | Fei et al. | |
| 2019/0178654 | A1 | 6/2019 | Hare | |

(Continued)

*Primary Examiner* — Jonathan M Blancha

(74) *Attorney, Agent, or Firm* — McDermott Will & Schulte LLP

(57) ABSTRACT

Aspects of the present disclosure are directed to a universal tracking module (UTM) capable of tracking six degrees of freedom of objects. In artificial reality environments, six degrees of freedom tracking refers to the ability to track an object moving and rotating freely in three-dimensional space along three axes of movement and Rotation. Six degrees of freedom tracking provides high precision in tracking movement and rotation in 3D space, enabling more accurate and realistic representations of objects and interactions in virtual and augmented reality environments, thereby allowing for more realistic and immersive experiences. In examples, the UTM includes a plurality of lightemitting diodes such that an image of the UTM can be utilized to determine the position and orientation of the UTM and the object to which the UTM is attached.

7 Claims, 21 Drawing Sheets

(56) References Cited

U.S. PATENT DOCUMENTS

| | | | |
|---|---|---|---|
| 2020/0042821 | A1 | 2/2020 | Dai et al. |
| 2020/0368616 | A1 | 11/2020 | Delamont |
| 2021/0072841 | A1* | 3/2021 | Purvis .................. A63F 13/211 |
| 2021/0116994 | A1 | 4/2021 | Woods |
| 2021/0318405 | A1* | 10/2021 | West ......................... G01S 1/70 |
| 2022/0244540 | A1* | 8/2022 | Chen ...................... A61B 17/92 |
| 2022/0373641 | A1 | 11/2022 | Eberspach et al. |
| 2025/0022145 | A1 | 1/2025 | Higgins et al. |

* cited by examiner

1902

1910 1912 1914

| UTM | UTM_ID | LED MAP |
|---|---|---|
| UTM_1 | ID_X4731 | LED_23 |
| UTM_2 | ID_D4323 | LED_AB |
| UTM_3 | ID_HGF8 | LED_25 |

1904

1916 1918

| UTM_ID | IMU_Data |
|---|---|
| ID_X4731 | X, Y, Z |
| ID_D4323 | $A_X$, $A_Y$, $A_Z$ |
| ID_HGF8 | <Data> |

1906

1920 1922

| Object | Object_ID |
|---|---|
| Table Tennis Paddle | ID_X4734 |
| Golf Club | ID_X4423 |
| Baseball Bat | ID_BG398 |

1908

1924 1926

| Object_ID | Input |
|---|---|
| ID_X4734 | Button_1_D |
| ID_X4734 | Button_2_U |
| ID_X4734 | Button_1_U |
| ID_BG398 | Button_3_D |

*FIG. 19*

UNIVERSAL TRACKING MODULE

CROSS-REFERENCE TO RELATED APPLICATIONS

This application claims priority under 35 U.S.C. § 121 as a divisional of U.S. patent application No. 18/351,026, filed Jul. 12, 2023, the disclosures of all of these applications and patents are incorporated by reference herein.

TECHNICAL FIELD

The present disclosure is directed to a universal tracking module (UTM) capable of performing six degrees of freedom tracking of objects.

BACKGROUND

Six degree of freedom tracking is a method for accurately measuring the movement and rotation of objects in three-dimensional (3D) space. Six degrees of freedom tracking provides for the ability to track objects along three axes of movement (x, y, and z) and three axes of rotation (pitch, yaw, and roll), providing a high level of precision in tracking the object's position and orientation. In the context of virtual reality (VR) and augmented reality (AR) systems, six degrees of freedom tracking can create a more realistic and immersive experience for a user. For example, accurate tracking of a user's head and hands allows for natural and intuitive interactions with virtual objects, enhancing the sense of presence and immersion in the virtual environment.

BRIEF DESCRIPTION OF THE DRAWINGS

FIG. 19 is a conceptual diagram illustrating data structures used in accordance with some implementations of the present technology.

The techniques introduced here may be better understood by referring to the following Detailed Description in conjunction with the accompanying drawings, in which like reference numerals indicate identical or functionally similar elements.

DETAILED DESCRIPTION

Figure 1:
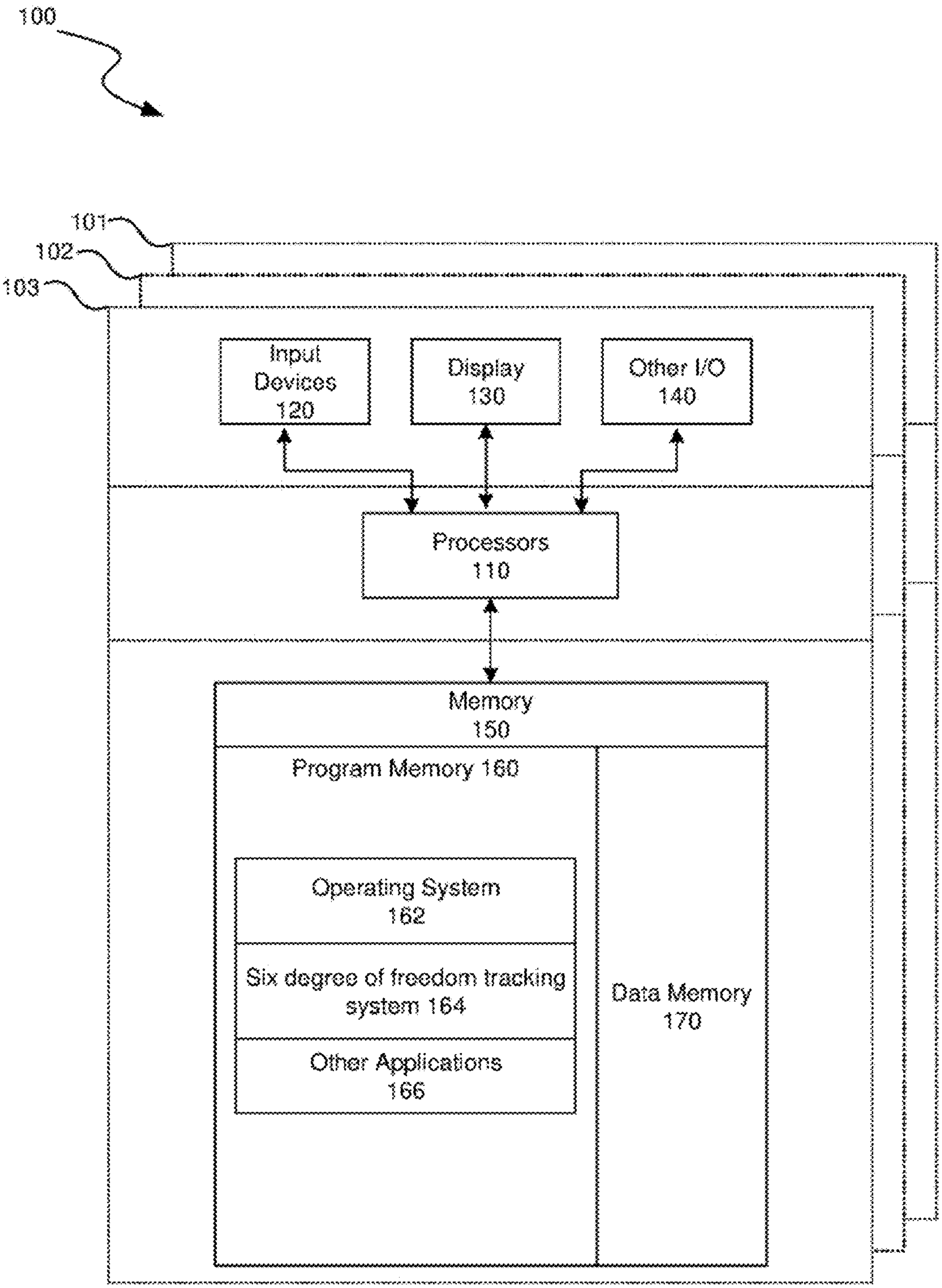
FIG. 1 is a block diagram illustrating an overview of devices on which some implementations of the present technology can operate.

Aspects of the present disclosure are directed to a universal tracking module (UTM) that can perform six degrees of freedom tracking of objects. In artificial reality environments, six degrees of freedom tracking refers to the ability to track an object moving and rotating freely in three-dimensional space along three axes of movement and rotation. Six degrees of freedom tracking provides high precision in tracking movement and rotation in 3D space, enabling more accurate and realistic representations of objects and interactions in virtual and augmented reality environments, thereby allowing for more realistic and immersive experiences.

In accordance with some implementations, the UTM can be attached to an object such that the UTM can track the object with six degrees of freedom. In examples, the UTM can be configured to illuminate one or more of its light emitting diodes (LEDs) such that an imaging device associated with a head-mounted display (HMO) can obtain an image of the LEDs of the UTM. The HMO can then perform image processing to precisely identify the positions of the LEDs with respect to the UTM and match the LEDs to an LED pattern, or configuration, that is specific to the UTM. In some examples, the identified positions of the LEDs can partially match an LED pattern. That is, at least two LED pattern locations are matched to at least two identified locations, where the at least matched two LED pattern locations correspond to a sub-pattern of the LED pattern for the UTM. Based on the LED pattern, position, orientation, and location information of the UTM can be obtained. In some examples, data from an Inertial measurement unit (IMU) of the UTM can be utilized by the HMO to more accurately determine position, orientation, and location information for the UTM. In some examples, a machine learning model can be implemented to determine position, orientation, and location information from the image obtained by the imaging device of the HMO. The position, orientation, and location information specific to the UTM can be translated to the object attached to the UTM such that a representation of the object can be rendered by the HMO in a virtual reality space.

In some examples, the UTM can implement Inside-Out tracking. Unlike "outside-in" tracking methods that use external cameras or sensors to track the objects, a UTM implementing Inside-Out tracking uses imaging devices within or on the UTM, along with computer vision algorithms, to determine the position and orientation of the UTM in 3D space. Rather than imaging the UTM and determining position, orientation, and location data from LEDs in the image, the position, orientation, and location information of the UTM can be determined by the UTM, acquired from the UTM, and then translated to the object attached to the UTM; accordingly, a representation of the tracked object can be rendered by the HMO in a virtual reality space in accordance with the position, orientation, and location information provided by the UTM.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMO) connected to a host computer system, a standalone HMO, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

In accordance with some implementations, the UTM provides a high level of precision in tracking movement and rotation in 30 space of an object, enabling more accurate and realistic representations of the object and interactions in virtual and augmented reality environments. Prior systems tracked the object itself, rather than providing the ability to use an interchangeable UTM configured to attach and detach from various objects or devices. Accordingly, existing systems do not provide the capability to provide six degrees of freedom tracking for any object. In accordance with some implementations, the UTM described herein can be attached or fixed to any object thereby providing the ability to track the object with six degrees of freedom precision. In examples, the UTM can be attached to a docking interface on a tracked object and communicate information from the object to the HMO for a more realistic and immersive experience. Alternatively, or in addition, the UTM can be attached to any object, allowing the object without a docking interface to be tracked and rendered by an HMO.

In addition, prior systems implementing six degrees of freedom tracking generally require large amounts of computational resources when determining position, orientation, and location information. These prior systems cannot be practically incorporated into devices with constrained computing resources. Some systems implement a reduced frame or rendering rate to track and render an object in order to accommodate a lack of computational resource availability, however these systems realize a tradeoff in performance level. In accordance with implementations described here, IMU data can be utilized to reduce the computational complexity involved in six degree of freedom tracking while maintaining performance levels.

Several implementations are discussed below in more detail in reference to the figures. FIG. 1 is a block diagram illustrating an overview of devices on which some implementations of the disclosed technology can operate. The devices can comprise hardware components of a computing system 100 that enable six degrees of freedom tracking for various objects. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor (s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other 1/0 devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the 1/0 devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, six degrees of freedom tracking system 164, and other application programs 166. Memory 150 can also include data memory 170 that can include, e.g., image data, IMU data, an environment map, LED mapping data, UTM configuration data, LED illumination scheduling data, Object configuration and pass through data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
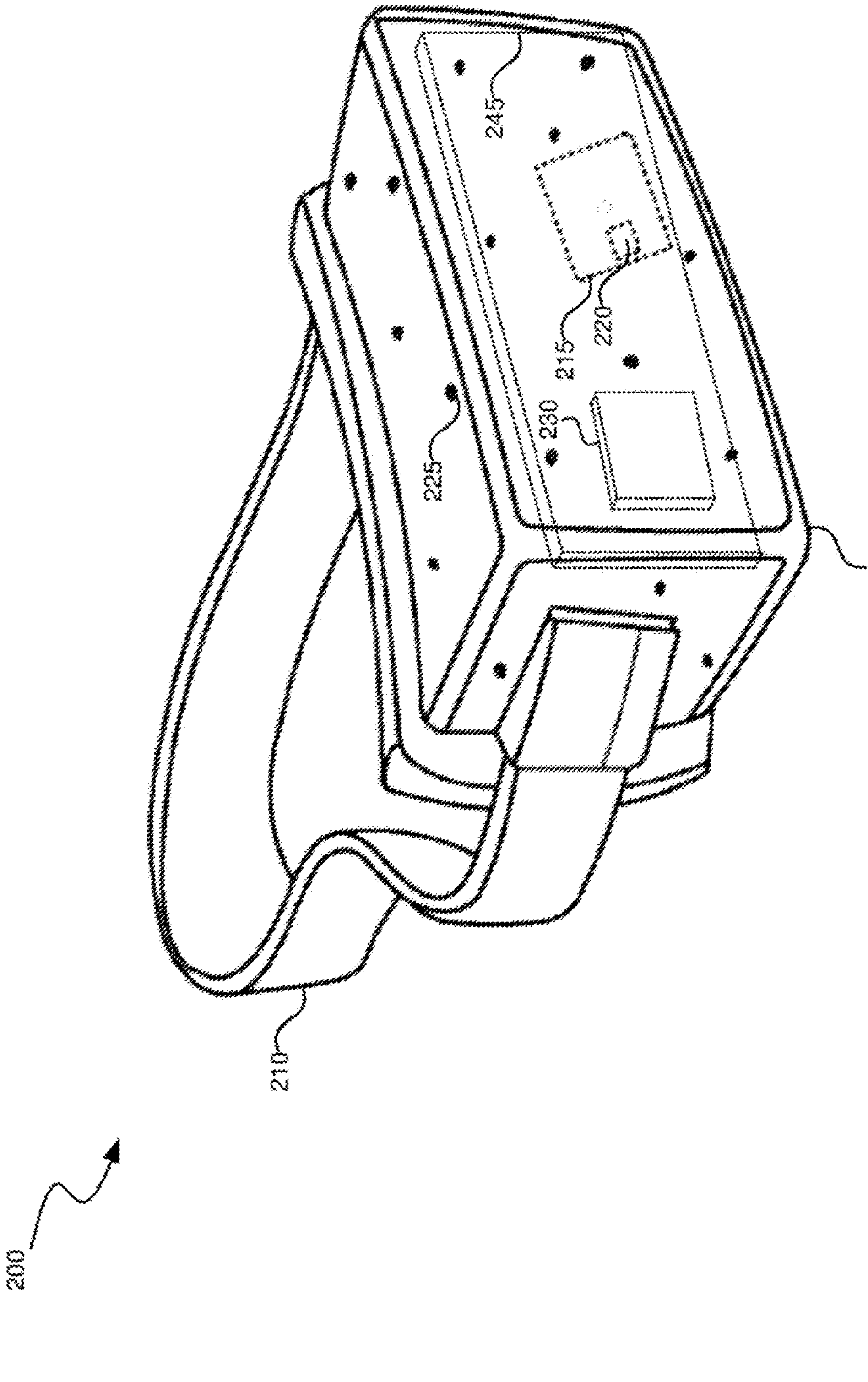
FIG. 2A is a wire diagram illustrating a virtual reality headset which can be used in some implementations of the present technology.
Figure 2B:
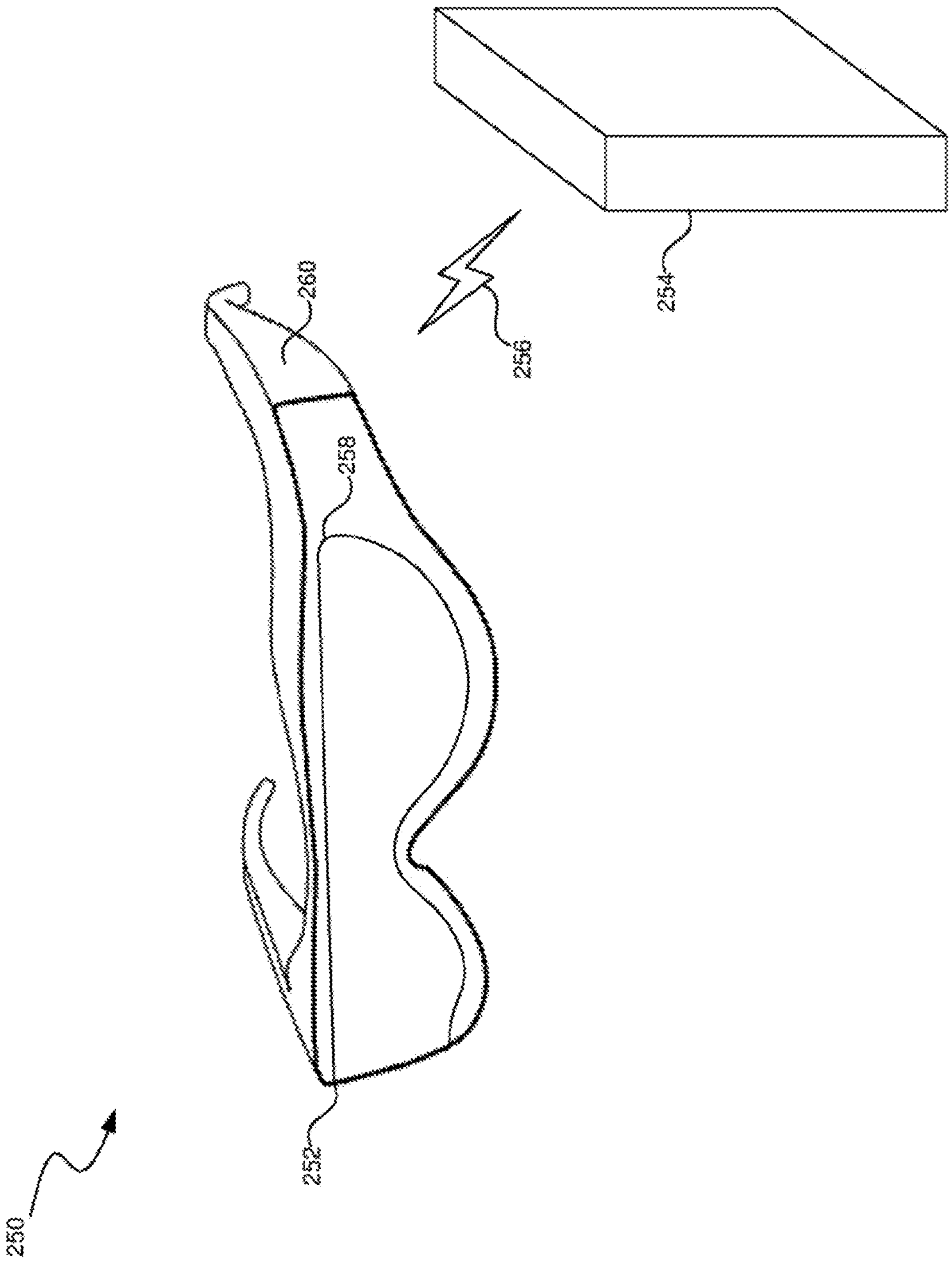
FIG. 2B is a wire diagram illustrating a mixed reality headset which can be used in some implementations of the present technology.

FIG. 2A is a wire diagram of a virtual reality head-mounted display (HMO) 200, in accordance with some embodiments. The HMO 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMO 200 and may not be visible to the user. In various implementations, the IMU 215, position sensors 220, and locators 225 can track movement and location of the HMO 200 in the real world and in an artificial reality environment in three degrees of freedom (3DoF) or six degrees of freedom (6DoF). For example, the locators 225 can emit infrared light beams which create light points on real objects around the HMO 200. As another example, the IMU 215 can include e.g., one or more accelerometers, gyroscopes, magnetometers, other non-camera-based position, force, or orientation sensors, or combinations thereof. One or more cameras (not shown) integrated with the HMO 200 can detect the light points. Compute units 230 in the HMO 200 can use the detected light points to extrapolate position and movement of the HMO 200 as well as to identify the shape and position of the real objects surrounding the HMO 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLEO) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMO 200 can be coupled to a core processing component such as a personal computer (PC) (not shown) and/or one or more external sensors (not shown). The external sensors can monitor the HMO 200 (e.g., via light emitted from the HMO 200) which the PC can use, in combination with output from the IMU 215 and position sensors 220, to determine the location and movement of the HMO 200.

FIG. 28 is a wire diagram of a mixed reality HMO system 250 which includes a mixed reality HMO 252 and a core processing component 254. The mixed reality HMO 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMO 252 and the core processing component 254. The mixed reality HMO 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMO 252. Controllers in the HMO 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMO 200, the HMO system 250 can also include motion and position tracking units, cameras, light sources, etc., which allow the HMO system 250 to, e.g., track itself in 3DoF or 6DoF, track portions of the user (e.g., hands, feet, head, or other body parts), map virtual objects to appear as stationary as the HMO 252 moves, and have virtual objects react to gestures and other real-world objects.

Figure 2C:
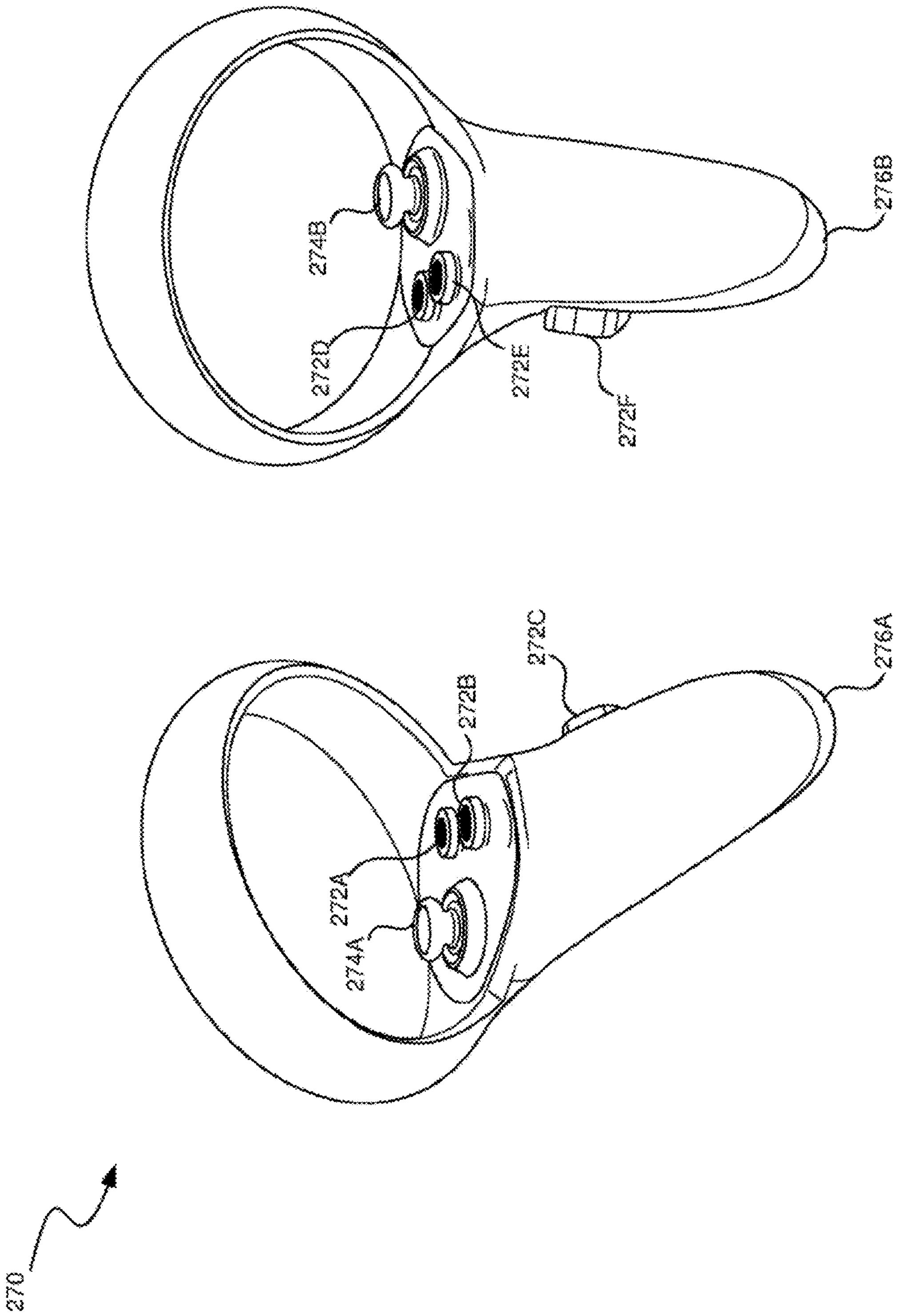
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMO 200 and/or HMO 250. The controllers 270 can be in communication with the HMDs, either directly or via an external device (e.g., core processing component 254). The controllers can have their own IMU units, position sensors, and/or can emit further light points. The HMO 200 or 250, external sensors, or sensors in the controllers can track these controller light points to determine the controller positions and/or orientations (e.g., to track the controllers in 3DoF or 6DoF). The compute units 230 in the HMO 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMO 200 or 250 can also include additional subsystems, such as an eye tracking unit, an audio system, various network components, etc., to monitor indications of user interactions and intentions. For example, in some implementations, instead of or in addition to controllers, one or more cameras included in the HMO 200 or 250, or from external cameras, can monitor the positions and poses of the user's hands to determine gestures and other hand and body motions. As another example, one or more light sources can illuminate either or both of the user's eyes and the HMO 200 or 250 can use eye-facing cameras to capture a reflection of this light to determine eye position (e.g., based on set of reflections around the user's cornea), modeling the user's eye and determining a gaze direction.

Figure 3:
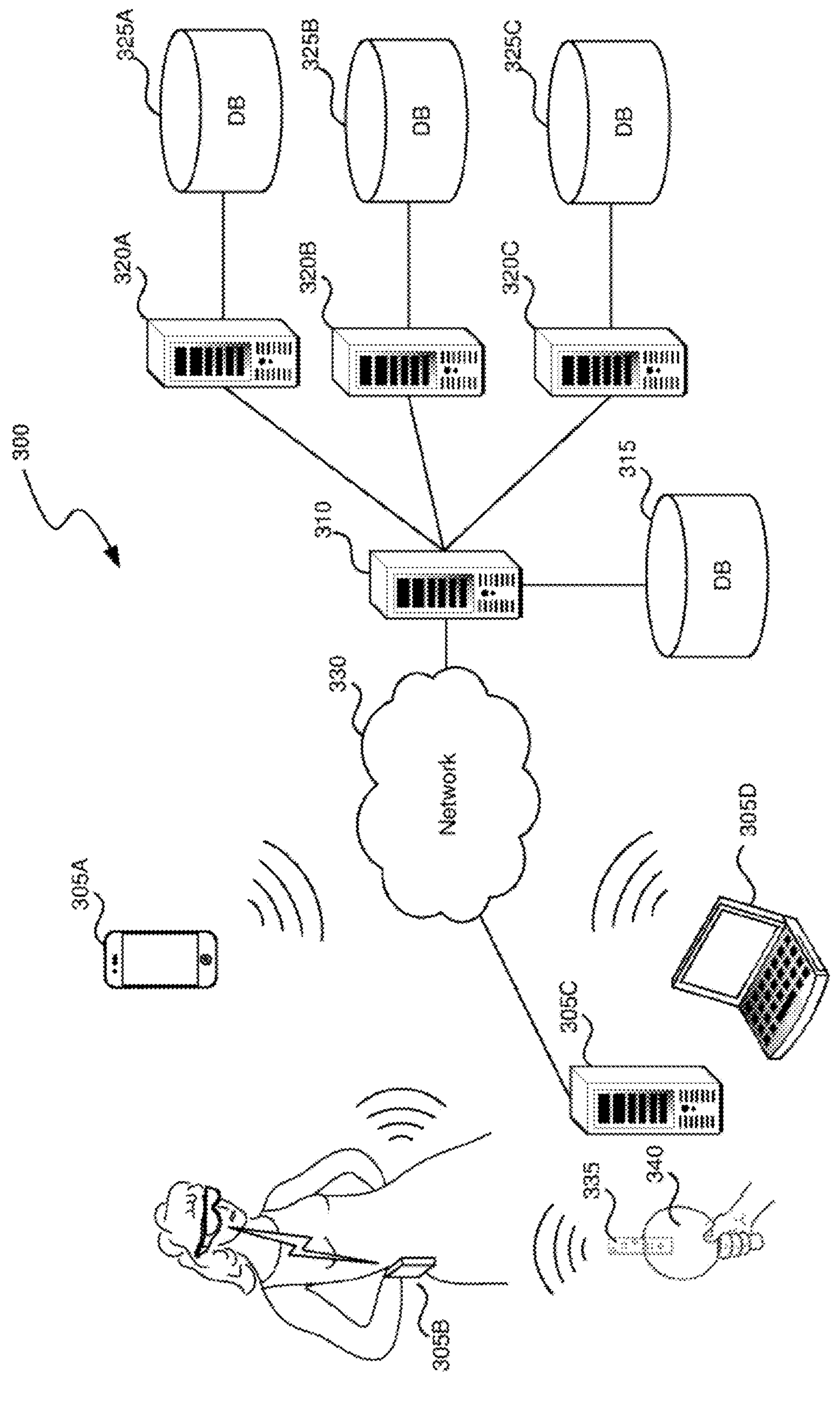
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-O, examples of which can include computing system 100. In some implementations, some of the client computing devices (e.g., client computing device 305B) can be the HMO 200 or the HMO system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Environment 300 can include one or more universal tracking modules (UTM) 335 coupled to an object 340, such as a sporting object, device, or item capable of being moved. Non-limiting examples of object 340 can include a ping pong paddle, golf club, or other sports item. The UTM 335 can include a docking interface allowing the UTM 335 to dock to and communicate with the object 335; the UTM 335 can further communicate with an HMO and provide measurement data from one or more inertial measurement units, UTM interactivity information (such as button press), and/or object interactivity information (such as button press, configuration settings, etc.). Additional details directed performing six degrees of freedom tracking are provided below with respect to FIGS. 4-19 .

Figure 4:
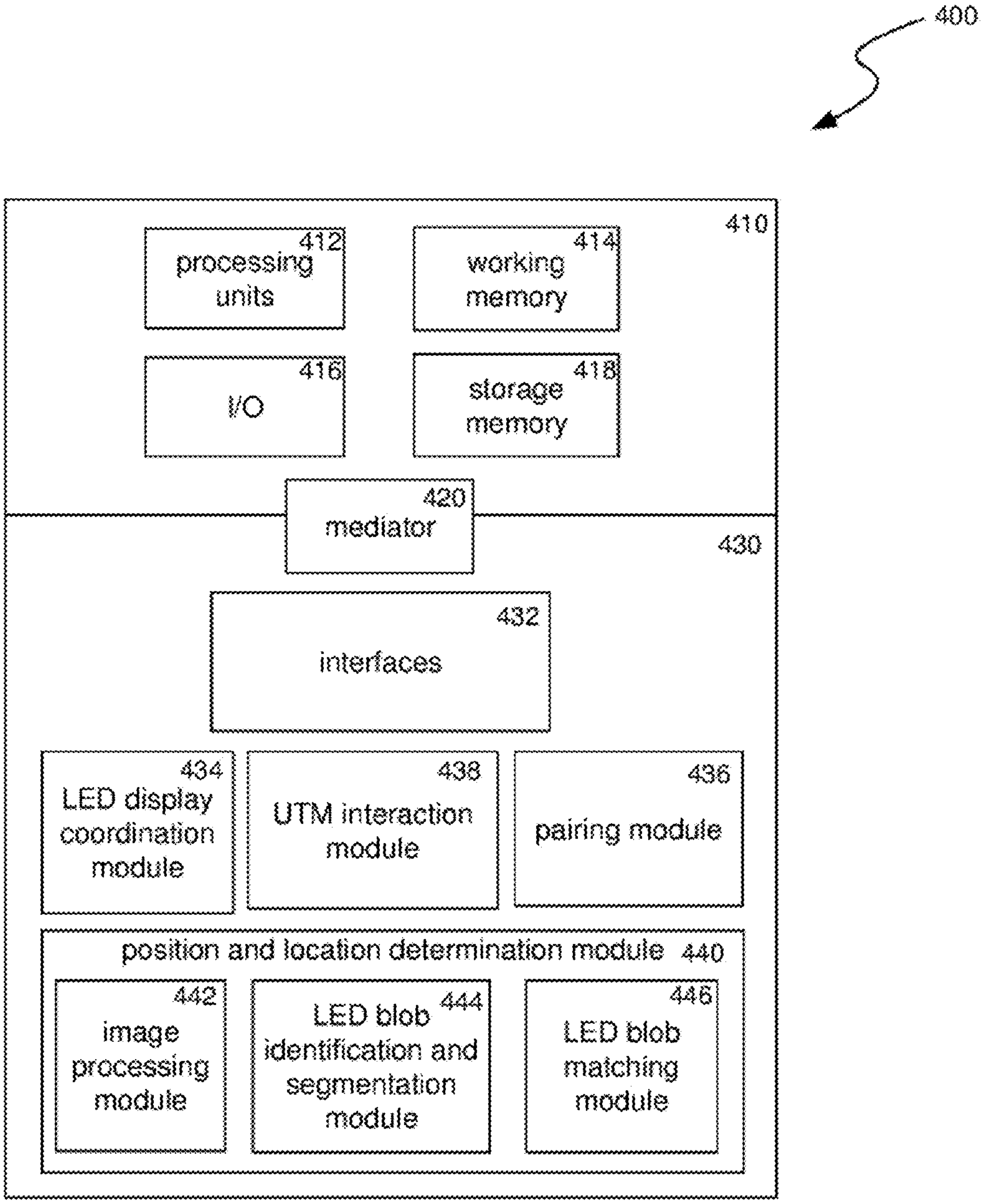
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for determining a position and orientation of UTM based on image and IMU data. Specialized components 430 can include an LED display coordination module 434, a UTM interaction module 438, a pairing module 436, and a position and orientation determination module 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

The LED display coordination module 434 can be configured to coordinate the blinking, illumination, or display of one or more LEDs located on the UTM. In examples, the LED display coordination module 434 can provide display configuration information including timing and duration information specific to one or more LEDs of the UTM to the UTM. Alternatively, or in addition, the LED display coordination module 434 can receive configuration information including timing and duration information specific to one or more LEDs of the UTM from the UTM. The display configuration information can configure the LEDs to blink, or otherwise, illuminate at a same time, or the display configuration information can configure one or more LEDS to blink at a time, rate, and/or duration that is different from another LED of the UTM. In accordance with some implementations, the display configuration information can be based on a frame rate of one or more imaging devices, such as a camera, attached to or otherwise integrated with an HMO of a XR system. In examples, the rate at which the LEDs blink can be modified such that the LEDs, when illuminated, are captured in an image captured by the one or more image devices.

The pairing module 436 can be configured to assist with the pairing of the HMO and the UTM. In some examples, the pairing module 436 can assist with the identification and configuration of the object to which the UTM is attached. For example, the object to which the UTM is attached can be a sports object such as a table tennis paddle and the UTM can relay pairing information of the UTM and the object to which the UTM is attached (table tennis paddle) to the HMO via the pairing module 436.

The UTM interaction module 438 can be configured to map external input data received at the UTM and/or object to which the UTM is attached. In examples, the UTM interaction module 438 can include one or more configurable feedback interfaces, such as a button or other input means. The UTM interaction module 438 can map feedback received at the UTM to one or more actions for an application executing on an HMO of a XR system. In some examples, the object to which the UTM interaction module is attached can include one or more configurable feedback interfaces, such as a button or other means of input. The UTM interaction module 436 can map feedback received at the object to which the UTM is attached to one or more actions for an application executing on the HMO.

The position and orientation determination module 440 can obtain the position and orientation of the UTM and translate the position and orientation of the UTM to a position and orientation of the object to which the UTM is attached. Using this translated position and orientation, the HMO can render a representation of the object to which the UTM is attached within an artificial reality environment. The position and orientation determination module 440 can include an image processing module 442, an LED blob identification and segmentation module 444, and an LED blob matching module 446. For example, the LED image processing module can process an image obtained by an imaging device, such as a camera, attached to or otherwise integrated with the HMO. The LED image processing module can perform image processing to remove one or more light sources not associated with the UTM. For example, one or more external lights may be stationary between successive images or frames obtained by the imaging device associated with the HMO. Such external sources of light can be removed or suppressed to reduce the probability of external sources of light interfering with the LED identification.

The LED blob identification and segmentation module 444 can be configured to identify and segment LED blobs obtained from one or more images acquired by the imaging device. In examples, the LED blob may present as a larger region in the image due to one or more factors, such as but not limited to light reflection, light smearing, light blurring, and/or LED shape distortion due in part to a changing position of the UTM. The LED blob identification and segmentation module 444 can identify a center of the blob for use by the LED blob matching module 446. For example, where the LED blob presents as a plurality of pixels in acquired image, the LED blob identification and segmentation module 444 can apply one or more models to extract or otherwise identify a center of the LED blob based on pixel brightness values, pixel locations, and LED blob shape. For instance, if the LED blob is distorted due in part to a position of the UTM, the LED blob identification and segmentation module 444 can identify the center of the LED blob based on LED blob shape.

The LED blob matching module 446 can match one or more LED blobs as identified by the LED blob identification and segmentation module 444, with one or more patterns or configurations specific to the UTM. In examples, a UTM identifier specific to a UTM can be used to obtain an LED pattern, or configuration, corresponding to the UTM. Each pattern or configuration, can include precise locations of the LEDs within the UTM. Accordingly, those LED blobs that are visible in an image acquired by the imaging device associated with the HMO can be mapped or matched to a corresponding LED on the LED blob pattern thereby providing a means to obtain the position and orientation of the UTM. In some examples, the positions of the LED blobs captured in an image can partially match an LED pattern. That is, at least two LED pattern locations can be matched to at least two LED blob locations, where the at least matched two LED pattern locations correspond to a sub-pattern of an LED pattern for the UTM. The position and orientation determination module 440 can utilize the LEDs matched to the LED pattern to translate the position and orientation of the UTM to the position and orientation of the object attached to the UTM. Further, an HMO of an XR system can render a representation of the object (e.g., three-dimensional representation) attached to the HMO within an artificial reality environment at a coordinate location based on the determined position and orientation information.

Figure 5:
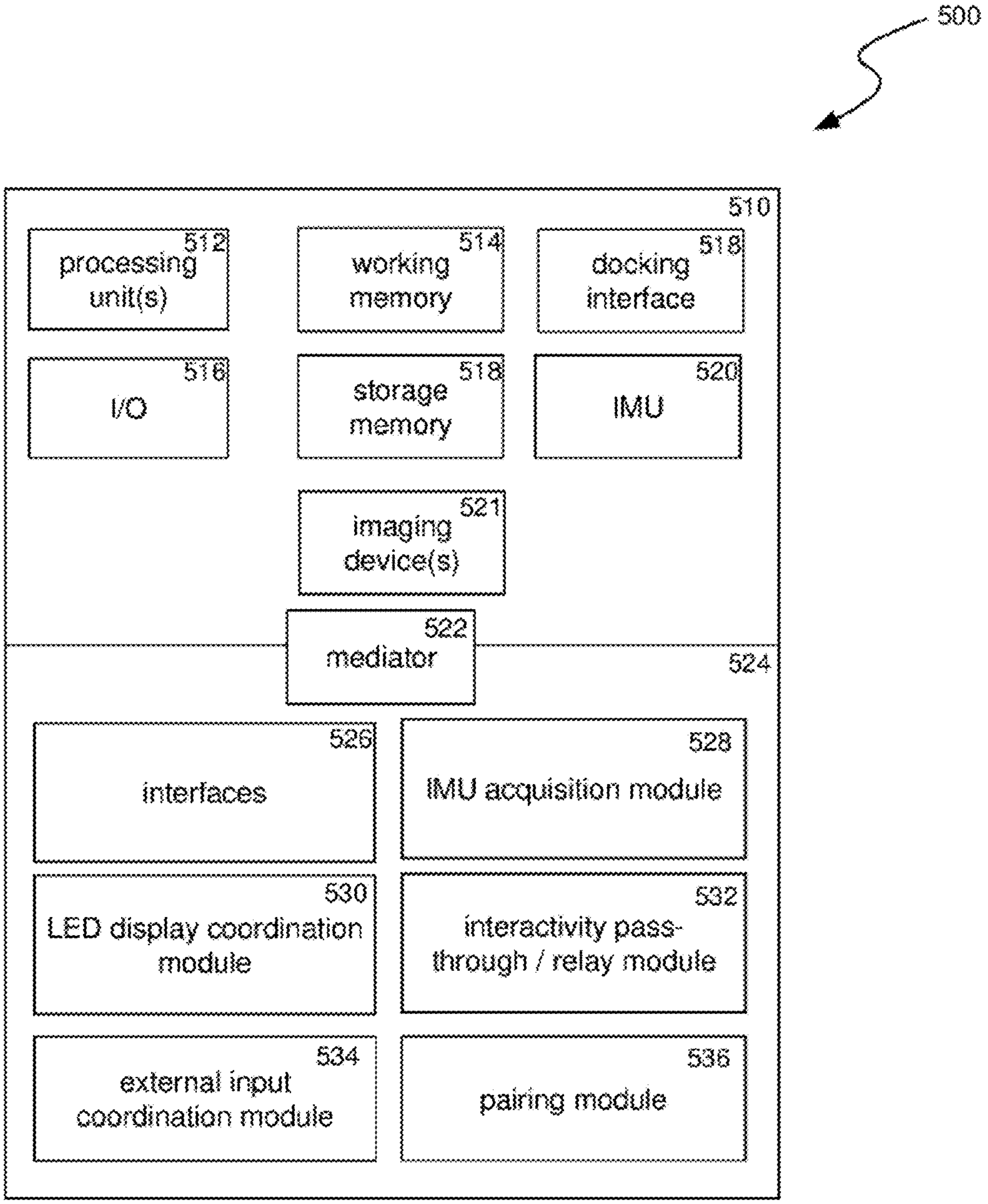
FIG. 5 is a block diagram illustrating components which, in some implementations, can be used in a system employing the disclosed technology.

FIG. 5 is a block diagram illustrating components 500 which, in some implementations, can be used in a system employing the disclosed technology. Components 500 can be included in a UTM, such as the UTM 330. Components 500 include hardware 510, mediator 522, and specialized components 524. As discussed above, a system implementing the disclosed technology can use various hardware including processing units 512, working memory 514, input and output devices 516 (e.g., cameras, IMU units, network connections, etc.), and storage memory 518. In various implementations, storage memory 518 can be one or more of: local devices, interfaces to remote storage devices, or combinations thereof. The IMU 520 is a specific example of an IMU utilized by the components 500. For example, the IMU 520 can provide measurements to calculate orientation, such as pitch, roll, and yaw, as well as location with respect to a global reference frame. The docking interface 518 can provide a physical interface to which an object can dock or otherwise attach to the UTM. In examples, the docking interface 518 can further provide a communication pathway between the UTM and an object attached to the UTM. The imaging device(s) 521 can correspond to a plurality of cameras oriented in a configuration (e.g., orthogonal position relative to one another) to capture images of an environment from different perspectives with respect to the UTM. In some implementations, the imaging device(s) 521 may not be utilized.

Mediator 522 can include components which mediate resources between hardware 510 and specialized components 524. For example, mediator 522 can include an operating system, services, drivers, a basic input output system (BIOS), controller circuits, or other hardware or software systems.

Specialized components 524 can include software or hardware configured to perform operations of the UTM based on configuration information shared with an HMO of an XR system. Specialized components 524 can include an IMU acquisition module 528, an LED display coordination module 530, an interactivity pass-through/relay module 532, an external input coordination module 534, a pairing module 536, and components and APIs which can be used for providing user interfaces, transferring data, and controlling the specialized components, such as interfaces 526. In some implementations, components 500 can be in a UTM that is distributed across multiple UTMs or can interface with one or more server-based applications executing one or more of specialized components 524. Although depicted as separate components, specialized components 524 may be logical or other nonphysical differentiations of functions and/or may be submodules or code-blocks of one or more applications.

The LED display coordination module 530 can be configured to coordinate the blinking, illumination, or display of one or more LEDs located on the UTM. In examples, the LED display coordination module 530 can provide display configuration information including timing and duration information specific to one or more LEDs of the UTM. The LED display coordination module 530 can receive configuration information, including timing and duration information specific to one or more LEDs of the UTM from the HMO or otherwise provide such information to the HMO. The display configuration information can configure the LEDs to blink or otherwise illuminate simultaneously, or the display configuration information can configure one or more LEDs to blink at a specified time, rate, and/or duration that is different from another LED of the UTM. In accordance with some implementations, the display configuration information can be based on a frame rate of one or more imaging devices, such as a camera, attached to or otherwise integrated with the HMO. For example, the rate at which the LEDs blink can be modified such that the LEDs, when illuminated, are captured in an image captured by the one or more imaging devices. The LED display coordination module 530 can be configured to communicate, either directly or indirectly, with the LED display coordination module 434 of FIG. 4. For example, the LED display coordination module 530 can provide an indication to the LED display coordination module 434 of the HMO that includes selectable blinking rates at which UTM can be configured to operate at; the LED display coordination module 434 of the HMO can then select a desired blinking rate (e.g., select from one of a plurality of available blinking rates and communicate the selection to the LED display coordination module 530).

The pairing module 536 can be configured to assist with the pairing of the UTM to the HMO. In some examples, pairing module 536 can assist with identifying and configuring the object to which the UTM is attached. For example, the object to which the UTM is attached can be a sports device such as a table tennis paddle, and the pairing module 536 can relay pairing information of the UTM and the object to which the UTM is attached (table tennis paddle) to the HMO (e.g., to the pairing module 436 of FIG. 4) via the pairing module 536. That is, an identifier associated with the object to which the UTM is attached can be communicated to the HMO via pairing module 536 and pairing module 436 of FIG. 4.

The IMU acquisition module 528 can be configured to obtain inertial measurement data from an IMU, such as the IMU 520. In examples, the IMU acquisition module 528 can retrieve raw data from the IMU, process the raw data and provide the processed data to the HMO. In some examples, the raw and/or processed data can correspond to acceleration information for each axis of the IMU, where the IMU can include at least three axes.

The external input coordination module 534 can be configured to map external input, and/or data received at the UTM to one or more actions, commands, etc. In examples, the external input coordination module 534 can include one or more configurable feedback interfaces, such as a button or other input means. The external input coordination module 534 can map the feedback received at the one or more feedback interfaces to one or more actions for an application executing on the HMO. In some examples, the object to which the UTM is attached can include one or more configurable feedback interfaces, such as a button or other means of input. The interactivity pass-through/relay module 532 can pass the feedback received at the object's one or more configurable feedback interfaces to the HOM. Thus, the HMO, via the UTM interaction module 438, can map feedback received at the object to which the UTM is attached to one or more actions for an application executing on the HMO.

For example, the one or more actions from the application executing at the HMO can cause the HMO to modify a rendering of a representation of the object, such as but not limited to a color or texture of the object, a scale or size of the object, an effect associated with the object (e.g., blinking, trailing pixels, falling stars, etc.), or other suitable modifications. In these examples, a physical feedback interface (e.g., button) at the real-world object can trigger one of more modifications the virtual representation of the object in VR, such as change the VR object's color or texture, make the VR object larger or smaller, and the like.

As previously discussed, a machine learning model can be implemented to determine position, orientation, and location information from an image obtained by the imaging device of an HMO. A "machine learning model," as used herein, refers to a construct that is trained using training data to make predictions or provide probabilities for new data items, whether the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayesian, clustering, reinforcement learning, probability distributions, decision tree forests, and others. Models can be configured for various situations, data types, sources, and output formats.

Those skilled in the art will appreciate that the components illustrated in FIGS. 1-5 described above and in each of the flow diagrams discussed below may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 6:
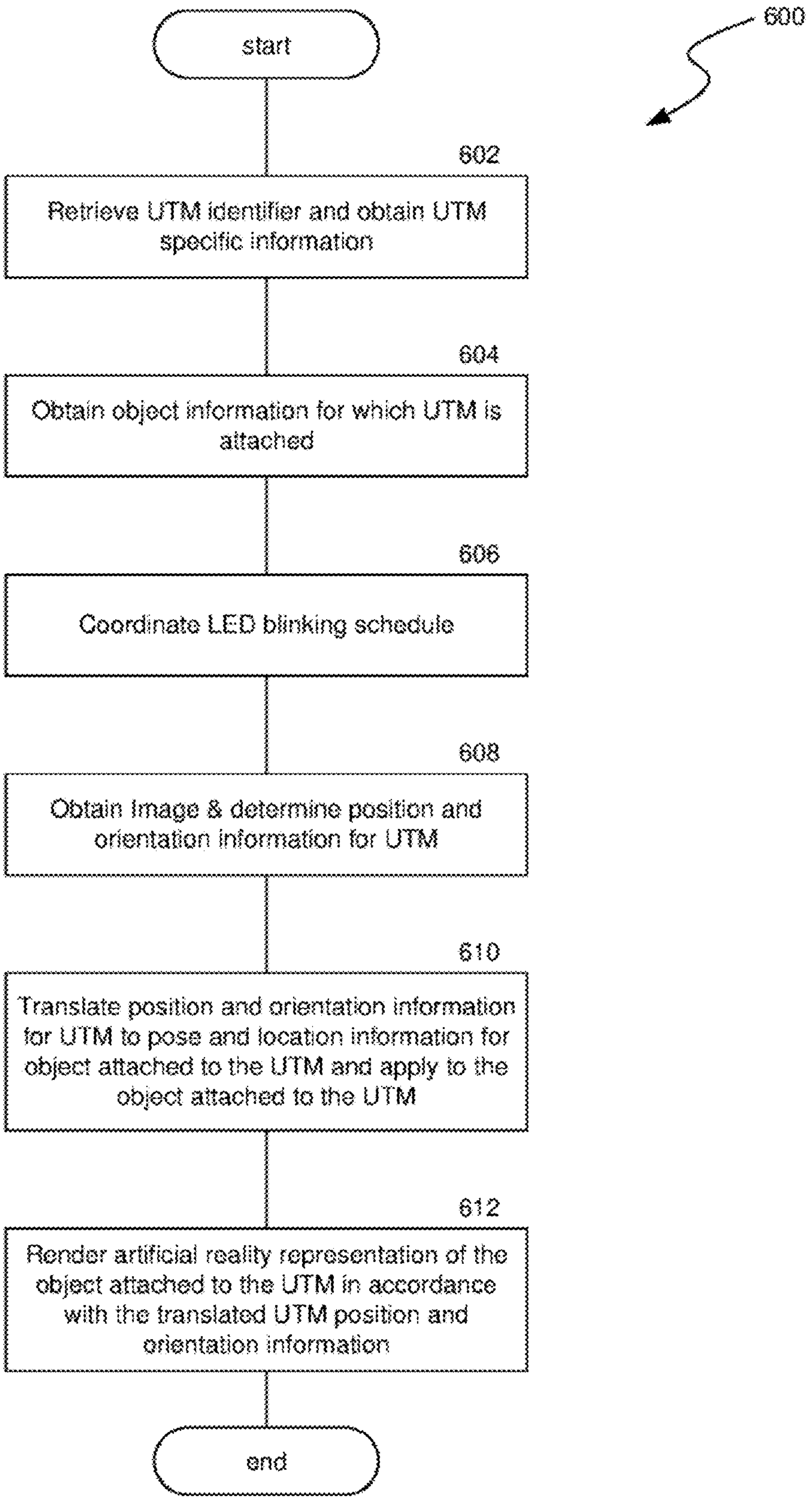
FIG. 6 is a flow diagram illustrating a process used in some implementations of the present technology for obtaining position and orientation information for an object attached to a UTM.

FIG. 6 is a flow diagram illustrating a process 600 used in some implementations for obtaining position and orientation information for an object attached to a UTM. In some implementations, process 600 can be performed in response to a request from the HMO to obtain position and orientation information for an object attached to the UTM. In some examples, the process 600 can be performed in conjunction with a frame rate of one or more imaging devices associated with the HMO; accordingly, the process 600 can determine position and orientation of an object at a rate approximately equal to the frame rate, half the frame rate, or other fraction of the frame rate. In some examples, the process 600 can be performed in real-time or performed substantially in real-time such that position and location information of an object can be obtained as an object is being moved. In some examples, the process 600 can operate using a UTM having a plurality of LEDs and/or can operate using a UTM having a plurality of cameras or other imaging devices.

At block 602, process 600 can receive an indication that a UTM has been paired with an HMO device of a XR system. In some examples, pairing can refer to the UTM being in communication with the HMO device. The process 600 can then retrieve an identifier and obtain UTM specific information. For example, the UTM identifier can be specific to a UTM and can be utilized to obtain LED pattern information that can be unique to the UTM itself. In some implementations, the UTM identifier can further be utilized to obtain UTM-specific information such as communication protocols and capabilities of the UTM.

The process 600 can then obtain object information for which the UTM is attached at block 604. In examples, the object to which the UTM is attached can be any object capable of being tracked. Examples of such objects can include sports equipment (e.g., table tennis paddle, golf club, or baseball bat), devices (e.g., smartphone, laptop, tablet), other movable devices (e.g., drone or vehicle), or any other suitable object. The object information for the object to which the UTM is attached can be specific to the object. For example, the object information can include an object identifier or other information specific to the configuration or capabilities of the object. In some examples, the UTM can be attached to objects without a docking interface or otherwise where a communication pathway between the UTM and the object is nonexistent. Thus, generic object information can be obtained for the object (e.g., generic table tennis paddle). For example, a table tennis paddle for use specifically in a virtual reality environment can be configured or otherwise provided with a docking interface to be communicatively coupled to a UTM. Alternatively, or in addition, a UTM can be fixedly attached to a standard table tennis paddle that has no docking interface or communication pathway. Accordingly, the UTM can be utilized to track virtually any object/device with a precision of six degrees of freedom. In some implementations, the UTM can be removably or temporarily attached to an object such that the object is returned to its default state after removal of the UTM (e.g., a table tennis paddle without an attached UTM). Some objects can maintain usability when the UTM is removed, such as a table tennis paddle that can be used to play real-world table tennis after removal of the UTM.

In accordance with some implementations, process 600 can coordinate an LED blinking schedule at block 606. In examples, the LED display coordination module 434 of FIG. 4 can provide display configuration information including timing and duration information specific to one or more LEDs of the UTM to the UTM via the LED display coordination module 530 of FIG. 5. Alternatively, or in addition, the LED display coordination module 434 can receive configuration information including timing and duration information specific to one or more LEDs of the UTM from the UTM via the LED display coordination module 530. The display configuration information can configure the LEDs to blink, or otherwise, illuminate at a same time, or the display configuration information can configure one or more LEDS to blink at a time, rate, and/or duration that is different from another LED of the UTM. In accordance with some implementations, the display configuration information can be based on a frame rate of one or more imaging devices, such as a camera, attached to or otherwise integrated with the HMO. For example, the rate at which the LEDs blink can be modified as needed such that the LEDs, when illuminated, are captured in an image captured by the device.

At block 608 the process 600 can obtain an image and determine position and orientation information for the UTM. As previously discussed, the imaging device attached to the HMO or integrated with the HMO can obtain an image whereby the image includes the UTM. In accordance with some implementations, the image obtained by the imaging device can include one or more LEDs of the UTM that are captured within a field of view of the imaging device. Additional details with respect to determining the position and orientation information for the UTM are described with respect to FIGS. 7 and 8.

At block 610, process 600 can translate the position and orientation information for the UTM to position and orientation information for the object attached to the UTM. For example, suppose the object attached to the UTM is a table tennis paddle. In that case, the position and orientation information of the UTM can be translated or otherwise applied to the table tennis paddle such that the HMO can utilize position and orientation information for the tennis table paddle. In some examples, the object attached to the UTM is associated with a three-dimensional structure. The three-dimensional structure can be a preexisting model including shape and dimension information of the object. In some implementations, the three-dimensional structure can be obtained from a manufacturer for example, or the three-dimensional structure can be created as object points (e.g., structural information) and surfaces (e.g., texture information) are acquired and placed in relation to one another. For example, one or more images of the object (e.g., from different perspectives) can be captured, such as by one or more cameras of a XR system, and processed to generate the object's three-dimensional representation.

Based on the three-dimensional structure, a mathematical transformation can be applied to transform the relative position and orientation of the three-dimensional structure of the UTM to the relative position and orientation of the three-dimensional structure of the object attached to the UTM. That is, the change in position and orientation of the UTM can be mapped, via a mathematical transformation for example, to a change in the position and orientation of the object attached to the UTM. As one additional non-limiting example, a relationship between the coordinate system of the UTM and the coordinate system of the object attached to the UTM can be used to perform one or more mathematical operations to convert the position and orientation data from the coordinate system of the UTM to the coordinate system of the object attached to the UTM. Thus, a change in the orientation and/or position of the UTM can be applied, or mapped, to change the orientation and/or position of the object attached to the UTM. In examples, one or more transformation matrices, quaternions, or other mathematical representations can be used.

At block 612, process 600 can then render a representation of the object attached to the UTM in accordance with the translated UTM position and orientation information. In some examples, the object can be rendered within an artificial reality environment at a coordinate location based on the determined position and orientation information. In some implementations, the rendered object can be a three-dimensional object. For example, data the stores the object's three-dimensional representation (e.g., mesh structure, textures, etc.) can be used in combination with the determined position and orientation information to render the three-dimensional object in the coordinate location.

Figure 7:
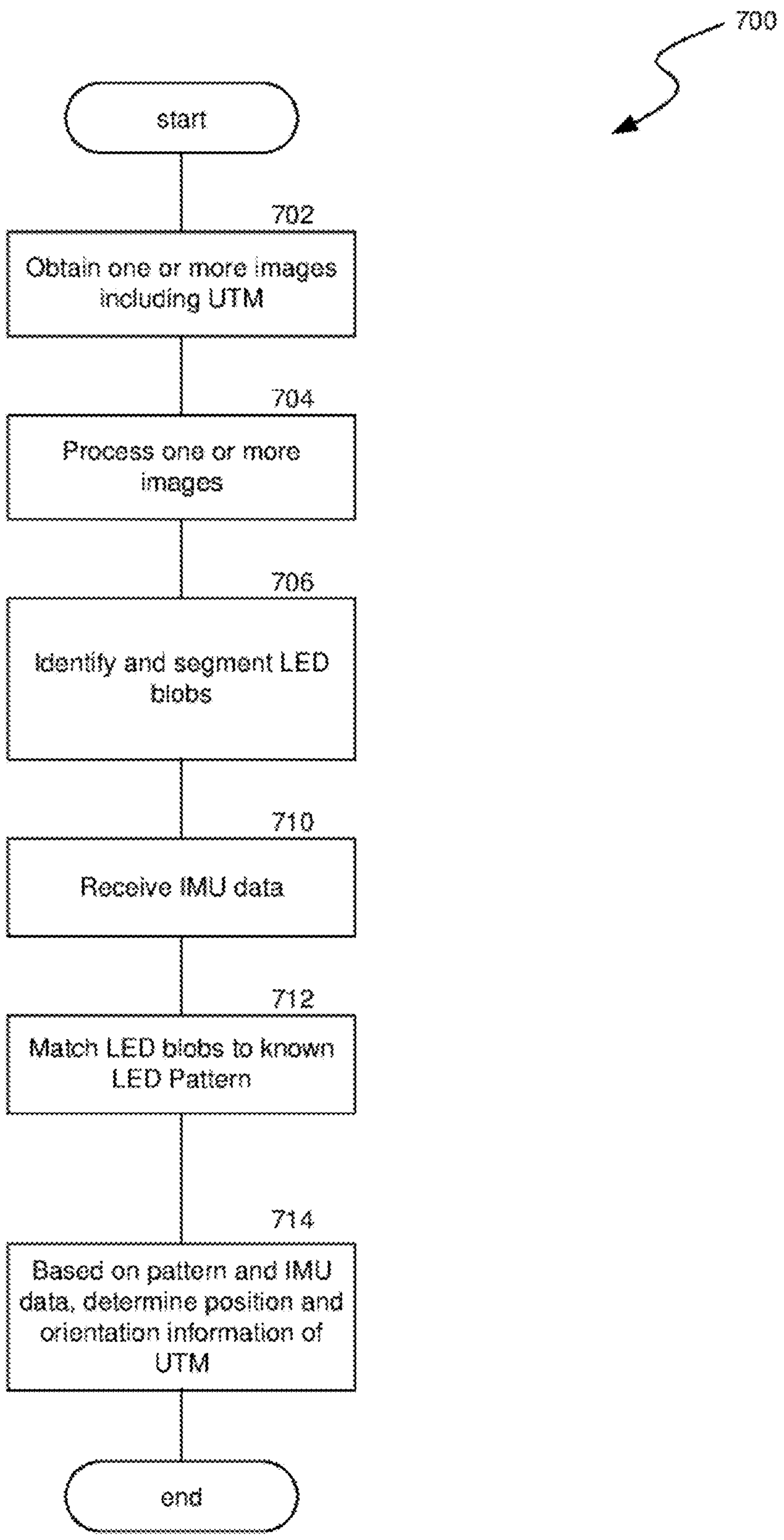
FIG. 7 is a flow diagram illustrating a process used in some implementations of the present technology for processing an image and matching light emitting diode (LED) positions to an LED map for obtaining position and orientation information for an object attached to a UTM.

FIG. 7 is a flow diagram illustrating additional details of block 608 for processing an image and matching LED positions to an LED map to obtain position and orientation information for an object attached to a UTM. In some implementations, process 700 can be performed in response to a request from an HMO of a XR system to obtain position and orientation information for an object attached to the UTM and in accordance with an LED blinking schedule. In some examples, the process 700 can be performed in real-time or performed substantially in real-time such that position and location information of an object can be obtained as the object is moving.

At block 702, process 700 can obtain one or more images of a UTM using an imaging device of the HMO. At block 704, process 700 can perform image processing to remove/suppress external light sources that are not associated with the UTM. For example, one or more external lights may be stationary between one or more successive images or frames obtained by the imaging device associated with the HMO. Such external sources of light can be removed or suppressed to reduce the probability of external sources of light interfering with the LED identification. At block 706, process 700 can identify and segment LED blobs obtained from the one or more images acquired by the imaging device. In examples, an LED blob may present as a larger region in the image due to one or more factors, such as but not limited to light reflection, light smearing, light blurring, and LED shape distortion due in part to a changing position of the UTM. Accordingly, process 700 can precisely identify the blob's center. For example, where the LED blob presents as a plurality of pixels in acquired image, process 700 can apply one or more models to extract or otherwise identify a center of the LED blob based on pixel brightness values, pixel locations, and LED blob shape. In some implementations, image pyramiding can be applied to down sampled images to localize LED blobs to known pixel locations. As another example, one or more of the images can be subjected to one or more feature detectors to identify LEDs from a detected blob.

At block 710, process 700 can receive IMU data from the UTM. As previously discussed, the IMU data can include specific XYZ coordinate location information, specific XYZ acceleration information, and or other information related to location of the UTM within a space. As one example, the other information can include gravity vector information. At block 712, process 700 can match the LED blobs identified at block 706 with one or more known LED patterns. In examples, the one or more known LED patterns are predefined for a UTM device identifier. Alternatively, or in addition, one or more patterns or configurations, are generally indicative of the position and orientation of the UTM. In some examples, the positions of the LED blobs captured in an image can be partially matched to an LED pattern. That is, at least two LED pattern locations can be matched to at least two LED blob locations, where the at least matched two LED pattern locations correspond to a sub-pattern of an LED pattern for the UTM.

In some examples, the IMU data can limit or otherwise reduce a set of LED patterns or configurations, having a low probability of matching identified LED blobs. For example, the probability that an LED pattern in the set of LED patterns matches an identified LED blob can be computed for each LED pattern or configuration, where each LED pattern in the set of LED patterns specify different arrangements of LEDs positioned around the UTM. The probability can be based on position and orientation data received from the IMU. If the computed probability is less than a threshold, then the LED pattern can be removed from the set of LED patterns. Accordingly, the amount of computation required to match identified LEDs to an LED pattern or configuration can be reduced as the amount of LED patterns or configurations that potentially match is reduced. Further, as the number of LED patterns is reduced, the computation time for determining position and orientation information of the UTM and or the object attached to the UTM is also reduced. At block 714, process 700 can determine the position and orientation information of the UTM based on the matched pattern at block 712. As previously discussed, the position and orientation information can be associated with a specific LED pattern attributable to the position and orientation of the UTM. Alternatively, or in addition, a matched pattern, together with the IMU data, can be utilized to generate the position and orientation information using one or more models, whereby one or more models are specific to the LED and/or matched LED pattern.

Figure 8:
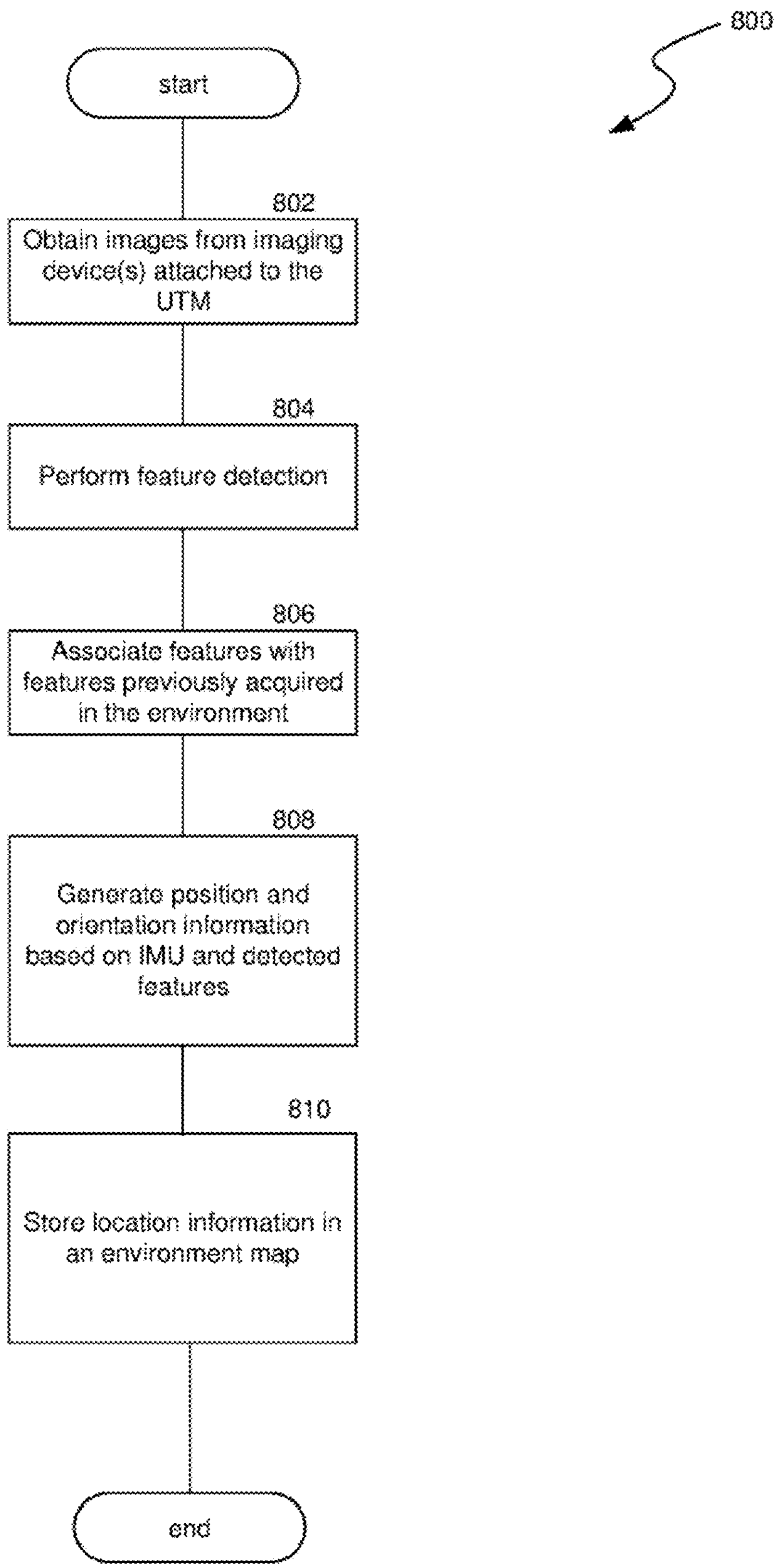
FIG. 8 is a flow diagram illustrating a process used in some implementations of the present technology for obtaining position and orientation information for an object attached to an Inside-Out type UTM.

FIG. 8 is a flow diagram illustrating additional details of block 608 for obtaining position and orientation information for an object attached to a UTM that implements Inside-Out tracking. Inside-Out tracking is a method of tracking the position and orientation of objects that can be used in coordination with artificial reality systems. Unlike "outside-in" tracking methods that use external cameras or sensors to track the objects, Inside-Out tracking uses built-in sensors, or imaging devices, on or within the objects themselves, along with computer vision algorithms, to determine their position and orientation in 3D space. In some implementations, process 800 can be performed in response to a request from an HMO of an XR system to obtain position and orientation information for an object attached to the UTM. In some examples, the process 800 can be performed in real-time or performed substantially in real-time such that position, and location information of an object can be obtained as the object is moved.

At block 802, the HMO can communicate with the UTM to establish a timing for obtaining position and orientation information of the UTM. Thus, the UTM can obtain a plurality of images from a plurality of imaging devices associated with the UTM. At block 804, feature detection can be performed to detect features such as corners, edges, or other distinctive points that can be used to identify and track the objects within the images. At block 806, process 800 can then associate the detected features with features previously acquired and included in an environment, such as a map associated with a SAM system. That is, at block 806, process 800 can match the detected features to known features included in a mapping system. In some examples, the map may reside at the UTM; alternatively, or in addition, the map can be accessed by the UTM such that the UTM is one of many devices accessing and contributing to the environment map.

At block 806, process 800 can use the matched features to determine the position, orientation, and location of the UTM in 3D space. For example, the UTM can fuse IMU data with known locations of the detected features to obtain the position, orientation, and location of the UTM. In some instances, the position, orientation, and location information can then be stored in an environment map, such as a SLAM map. The position, orientation, and location information of the UTM can be provided directly to the HMO; alternatively, or in addition, the HMO can access a shared environment map to obtain the position, orientation, and location information of the UTM.

Figure 9:
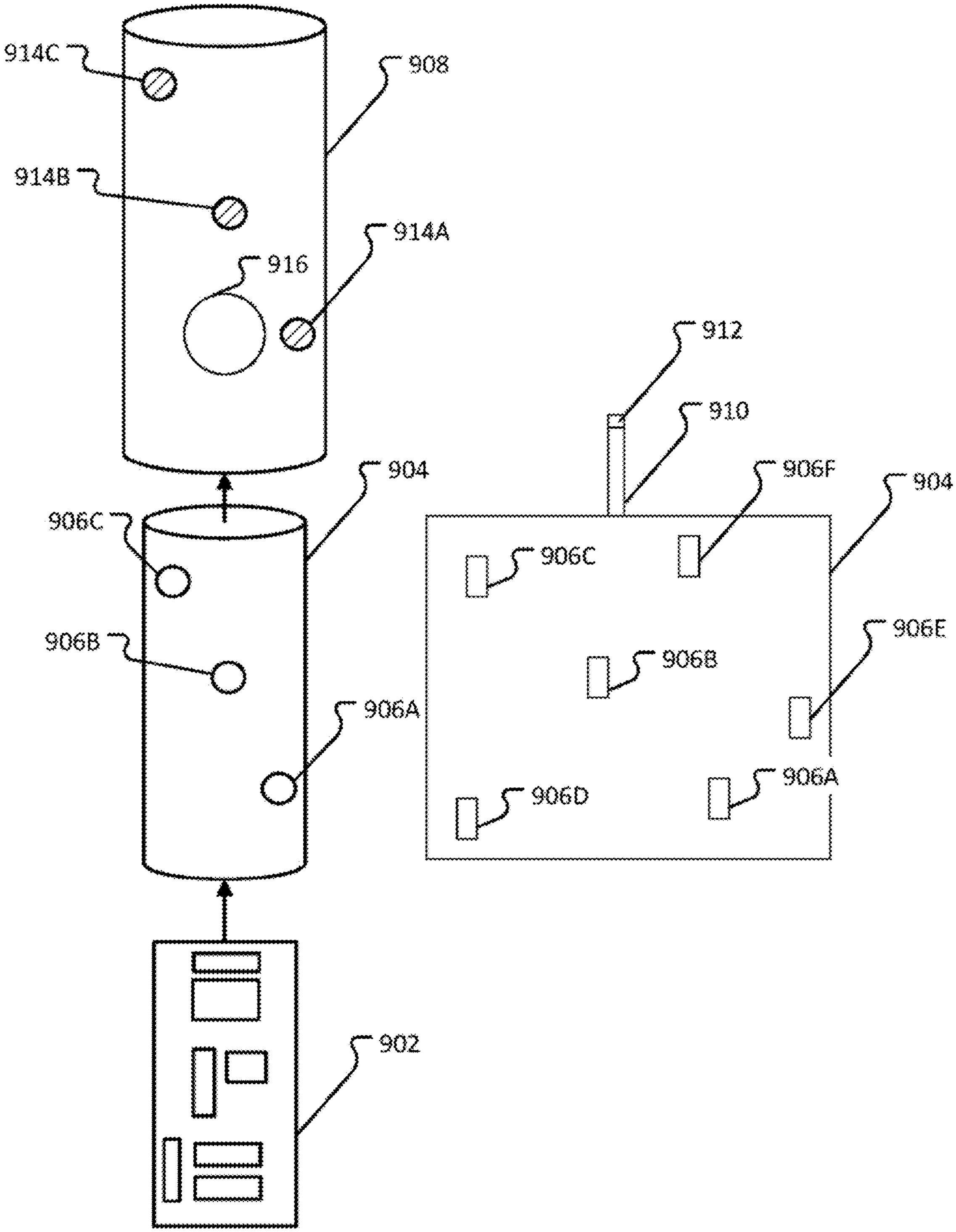
FIG. 9 depicts a conceptual diagram illustrating a UTM assembly used in some implementations of the present technology.

FIG. 9 depicts a conceptual diagram of a UTM assembly 900 used in some implementations of the present technology. The UTM assembly 900 can include a main logic board 902 configured to reside or otherwise be placed within an LED wrap 904 and a cover 908. The LED wrap 904 can be comprised of a flexible material on which a plurality of LEDs, 906A-906F, can be affixed. LEDs 906A-906F can be any type of LED configured to emit light. In some examples, the LEDs 906A-906F can emit light in the infrared spectrum. Alternatively, or in addition, the LEDs 906A-906F can emit energy having a different wavelength. In examples the LED wrap 904 can further include an LED interface 912 and cable 910, attaching the LED wrap 904 to the main logic board 902. As further depicted in FIG. 9, the LED wrap 904 can be wrapped around or otherwise placed around the main logic board 902 such that the main logic board 902 together with the LED wrap 904 can be placed within cover 908.

As further depicted in FIG. 9, cover 908 can be configured such that light associated with respective LEDs 906A-906F can penetrate cover 908 (e.g., at example positions 914A-914C) and be viewable from a position external to the UTM assembly 900. In some implementations, an angle between the surface of cover 908 and an imaging device associated with the HMO can limit or restrict what LEDs 906A-906F are visible to the imaging device associated with the HMO. That is, if an angle between the surface of cover 908 and the imaging device of the HMO is greater than or equal to a threshold angle, light emitted from one or more LEDs 906A-906F within the cover 908 will not be detected by the imaging device associated with the HMO. Thus, the UTM may be required to be at a specific orientation and position with respect to the position and orientation of an imaging device associated with the HMO for one or more LEDS 906A-906F to be detectable. Such a design can aid in determining the position and orientation of the UTM using captured images of the UTM that capture a portion of LEDS 906A-906F. The Cover 908 can include one or more apertures or areas for providing a tactile feedback source, such as a switch or button, which users can utilize to interact with the UTM.

Figure 10:
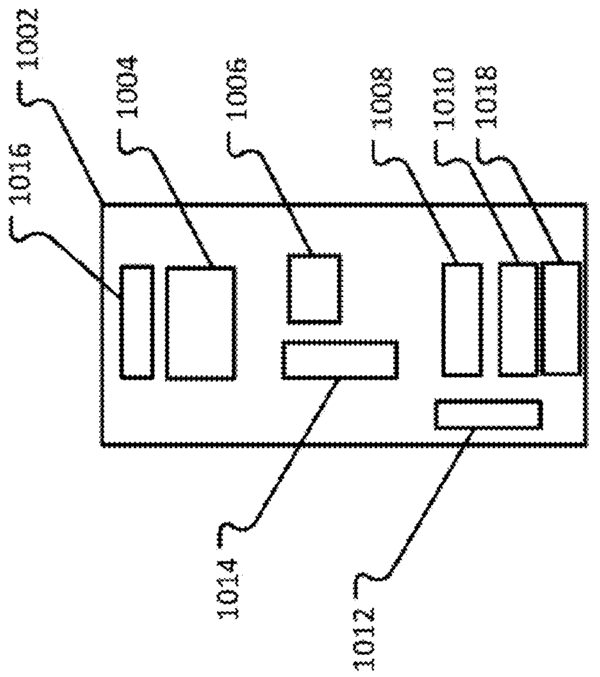
FIG. 10 is a conceptual diagram illustrating additional details of a main logic board used in some implementations of the present technology.

FIG. 10 is a conceptual diagram illustrating additional details of the main logic board 1002 used in some implementations of the present technology. In examples, the main logic board 1002 may be the same as or similar to the main logic board 902. The main logic board 1002 can include a processor 1004, Inertial Measurement Unit (IMU) 1006, tactile feedback source (e.g., switch) 1008, and a power supply 1010 such as a battery, capacitor or otherwise. The main logic board 1002 can further include an LED interface 1012 for communicatively coupling the LED interface 912. The main logic board 1002 can include an LED driver 1014 to provide power and/or drive one or more LEDs. In implementations, the main logic board 1002 can include radio 1016 for communicating with a network and/or an HMO of an XR system. In addition to the radio 1016, the main logic board 1002 can include a docking Interface 1018 for docking with and/or attaching to a tracked object. Although depicted as being arranged in a specific manner, it should be understood that the components described with respect to FIG. 10 can be arranged on the logic board 1002 in various combinations and orientations that may be different than that which illustrated.

Figure 11:
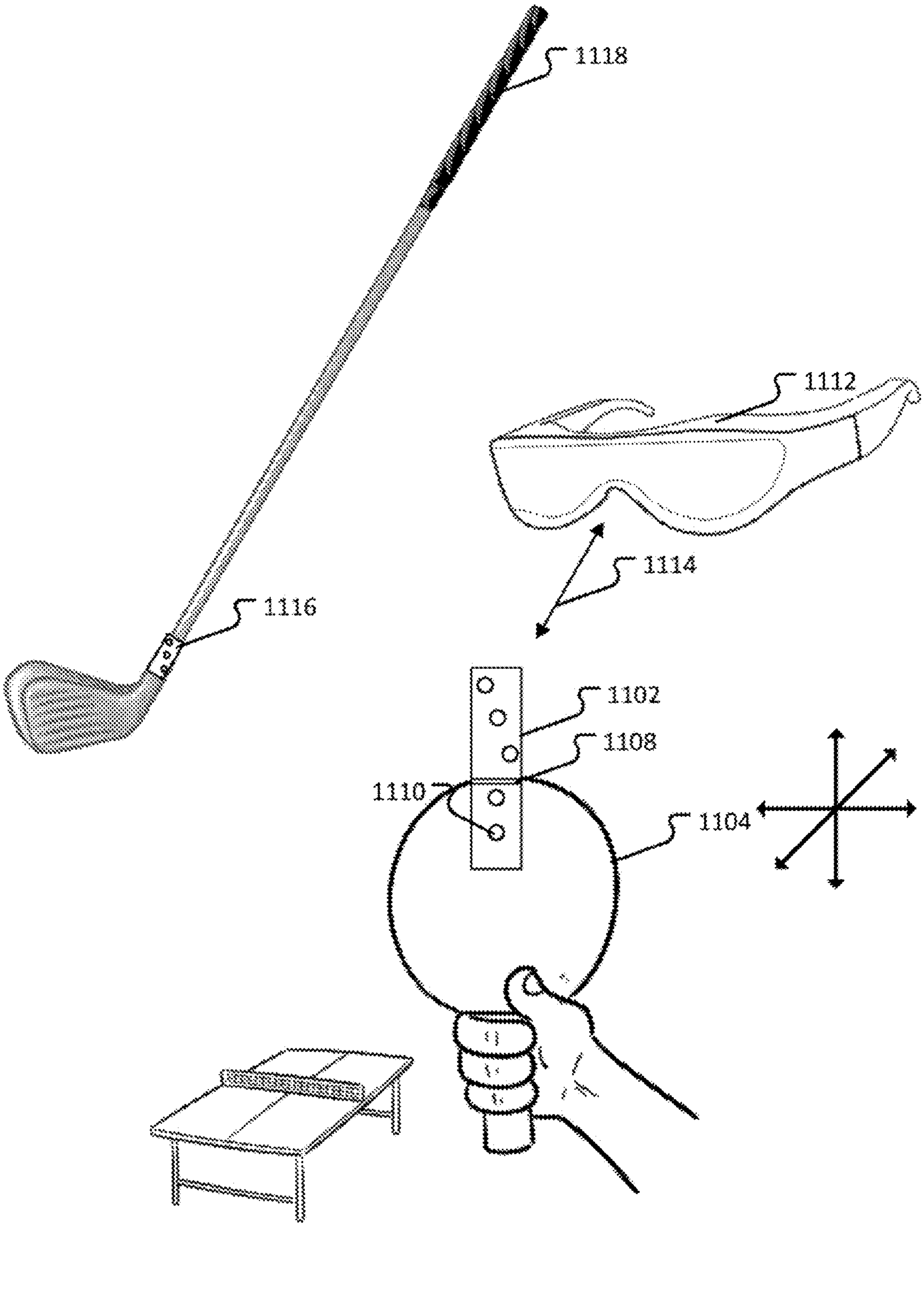
FIG. 11 is a conceptual diagram illustrating various configurations in which a UTM can be attached or mounted to an object in accordance with some implementations of the present technology.

FIG. 11 is a conceptual diagram illustrating various configurations in which a UTM can be attached or mounted to an object in accordance with some implementations of the present technology. As depicted in FIG. 11, the UTM 1102 can be docked to a table tennis paddle 1104 utilizing a docking interface 1108 of the table tennis paddle 1104. As another example, the UTM 1116 can be attached to or mounted to a golf club 1118 without a docking interface. As further depicted in FIG. 11, the UTM 1102 and/or 1116 can communicate with the HMO 1112 utilizing a communication pathway 1114. For example, the communication pathway 1114 can be any type of wireless communication protocol such as Bluetooth™M, Wi-Fi, or other. As further depicted in FIG. 11, the table tennis paddle 1104 can include one or more interactivity buttons, such as button 1110. Buttons 1110 can allow a user to provide object configuration information to the UTM, whereby the UTM can communicate such information to the HMO utilizing the communication pathway 1114.

Figure 12:
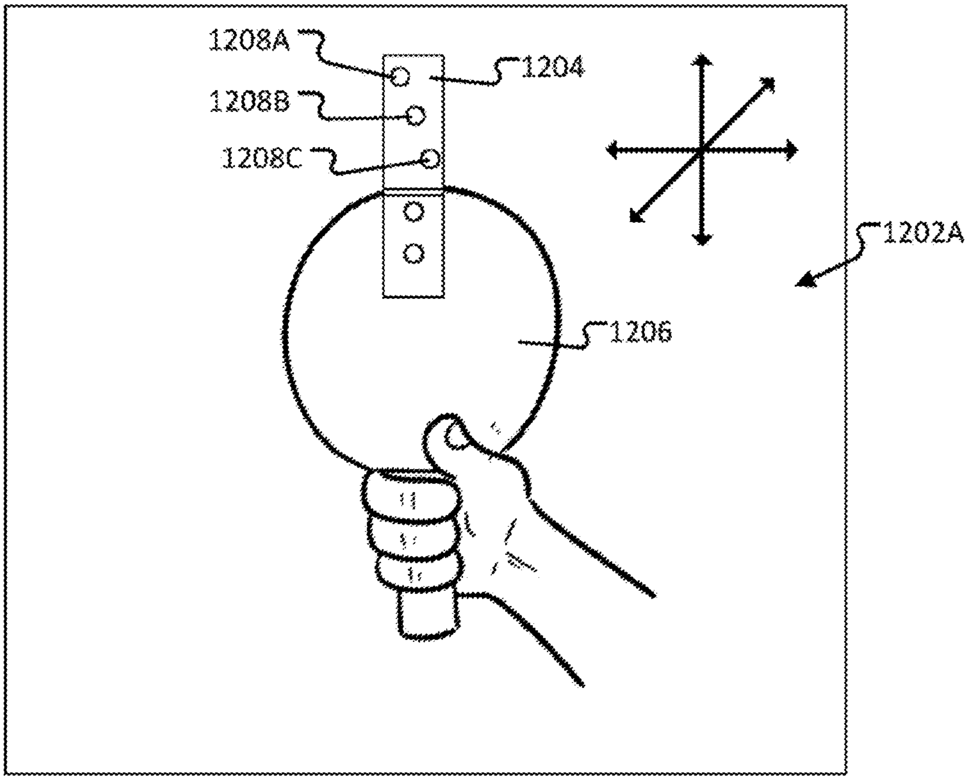
FIG. 12 is a conceptual diagram illustrating various views of a UTM and object in accordance with some implementations of the present technology.
Figure 12:
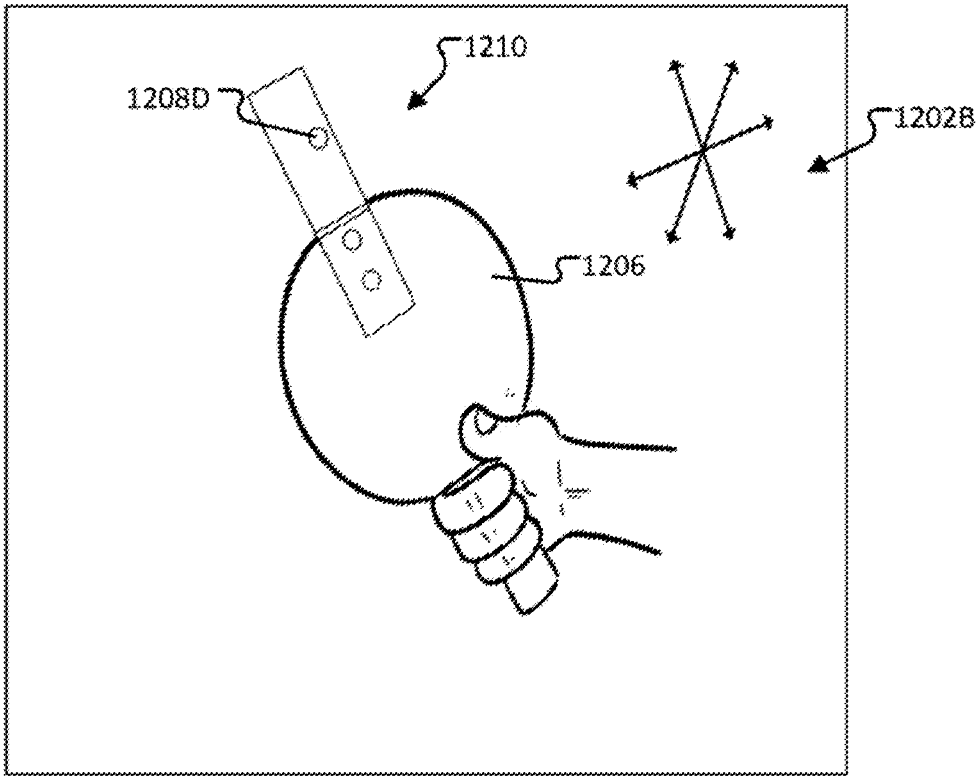

FIG. 12 depicts a conceptual diagram of one or more views 1202A-1202B of UTM 1204 and object 1206. View 1202A can be the first image acquired from an imaging device associated with an HMO, while view 1202B can be a second subsequent image acquired from the imaging device associated with the HMO. As depicted in the first view, 1202A, LEDs 1208A-120C are captured based on the position and orientation of the table tennis paddle 1206 and UTM 1204. In the subsequent view 1202B, a different LED 1208D is captured based on a different position and orientation of the table tennis paddle 1206 and UTM 1204. An HMO can obtain position, orientation, and location information for the table tennis paddle 1206 utilizing LEDs 1208A-1208C in view 1202A and using the LED 1208D in view 1202B.

Figure 13:
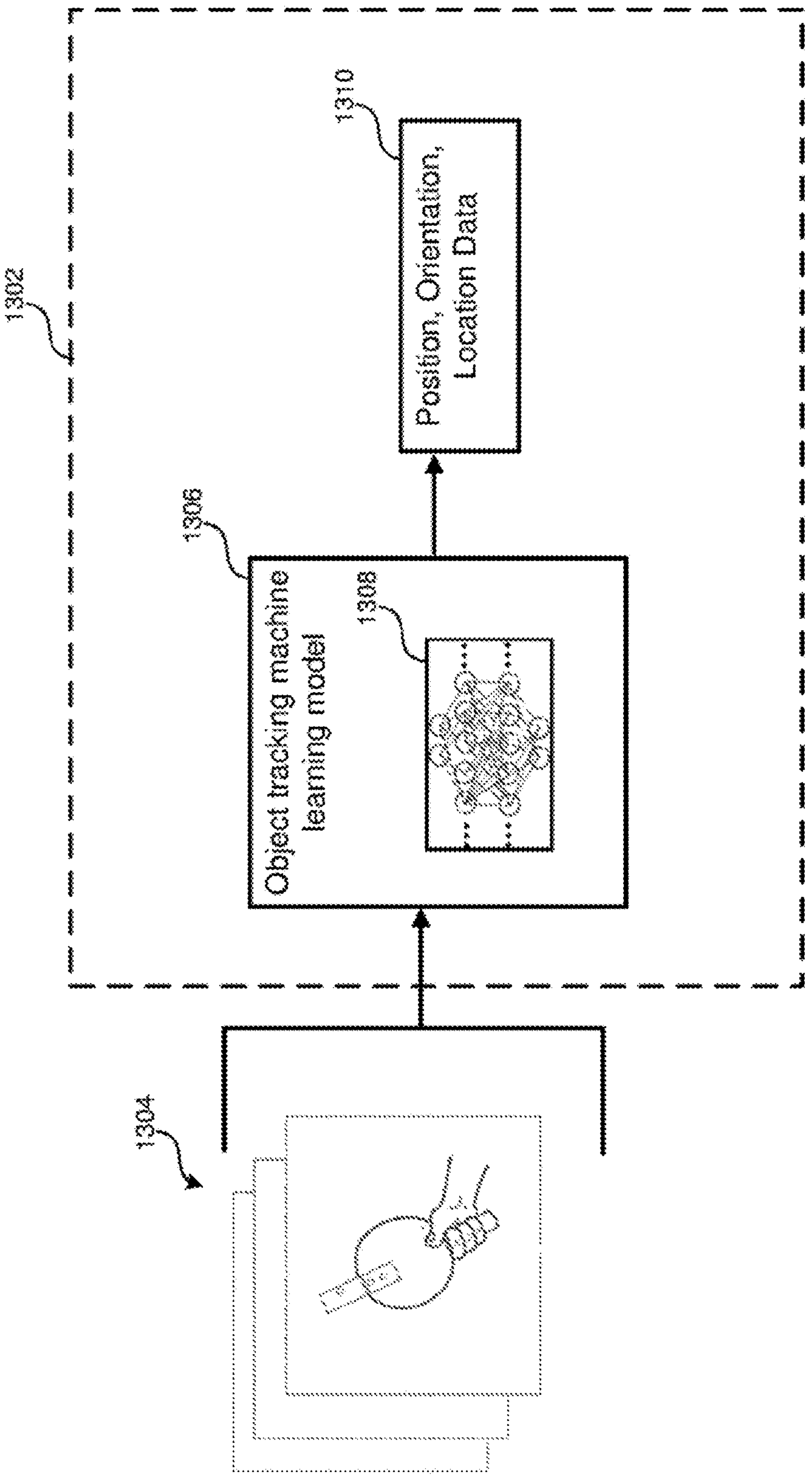
FIG. 13 is a conceptual diagram illustrating a process for obtaining position, orientation, and location data utilizing an image of a UTM and an object-tracking machine learning model in accordance with some implementations of the present technology.

FIG. 13 depicts a conceptual diagram for obtaining position, orientation, and location data utilizing an image of the UTM 1304 and an object-tracking machine learning model 1306 in accordance with some implementations of the present technology. For example, the HMO 1302 can utilize the object-tracking machine learning model 1306 trained on UTM image data of UTMs and the corresponding position, orientation, and location data of the UTM. In some examples, the object-tracking machine learning model 1306 can be trained on image data of UTMs, IMU data as previously discussed, and the corresponding position, orientation, and location data of the UTM. Accordingly, image 1304 of the UTM can be obtained and provided to the object-tracking machine learning model 1306. In some examples, the object tracking machine learning model 1306 includes a neural network 1308. The object-tracking machine learning model 1306 can then perform an inference operation to determine the position, orientation, and location data 1310 which can be translated to the position, orientation, and location data for the object attached to the UTM.

In some examples, the object attached to the UTM is associated with a three-dimensional structure. The three-dimensional structure can be a preexisting model including shape and dimension information of the object. In some implementations, the three-dimensional structure can be obtained from a manufacturer for example, or the three-dimensional structure can be created in real-time as object points and surfaces are acquired and placed in relation to one another. For example, triangulation can be used to process a relationship between multiple images, or views, of an object, such that object surface points can be extracted from each image and converted into a three-dimensional representation (e.g., three-dimensional structure). In some examples, the three-dimensional structure can be used to render the object in an XR environment.

In some implementations, based on the three-dimensional structure, the object tracking and machine learning model 1306 can utilize a mathematical transformation to transform the relative position and orientation of the three-dimensional structure of the UTM to the relative position and orientation of the three-dimensional structure of the object attached to the UTM. That is, the change in position and orientation of the UTM can be mapped, via a mathematical transformation for example, to a change in the position and orientation of the object attached to the UTM. As one non-limiting example, a relationship between the coordinate system of the UTM and the coordinate system of the object attached to the UTM can be used to perform one or more mathematical operations to convert the position and orientation data from the coordinate system of the UTM to the coordinate system of the object attached to the UTM.

In some examples, the relationship between the coordinate system can be based on a known, or preestablished, origin of the UTM (e.g., the origin of the IMU), a known location on the UTM where the object is attached (e.g., the docking interface), and a known location on the object where the UTM is attached (e.g., the object's docking interface). Thus, a change in the orientation and/or position of the UTM can be applied, or mapped, to change the orientation and/or position of the object attached to the UTM. In some examples, the change in the orientation and/or position of the UTM can be based on a previously known orientation and/or position of the UTM. One or more transformation matrices, quaternions, or other mathematical representations can be used to transform the relative position and orientation of the three-dimensional structure of the UTM to the relative position and orientation of the three-dimensional structure of the object attached to the UTM.

Figure 14:
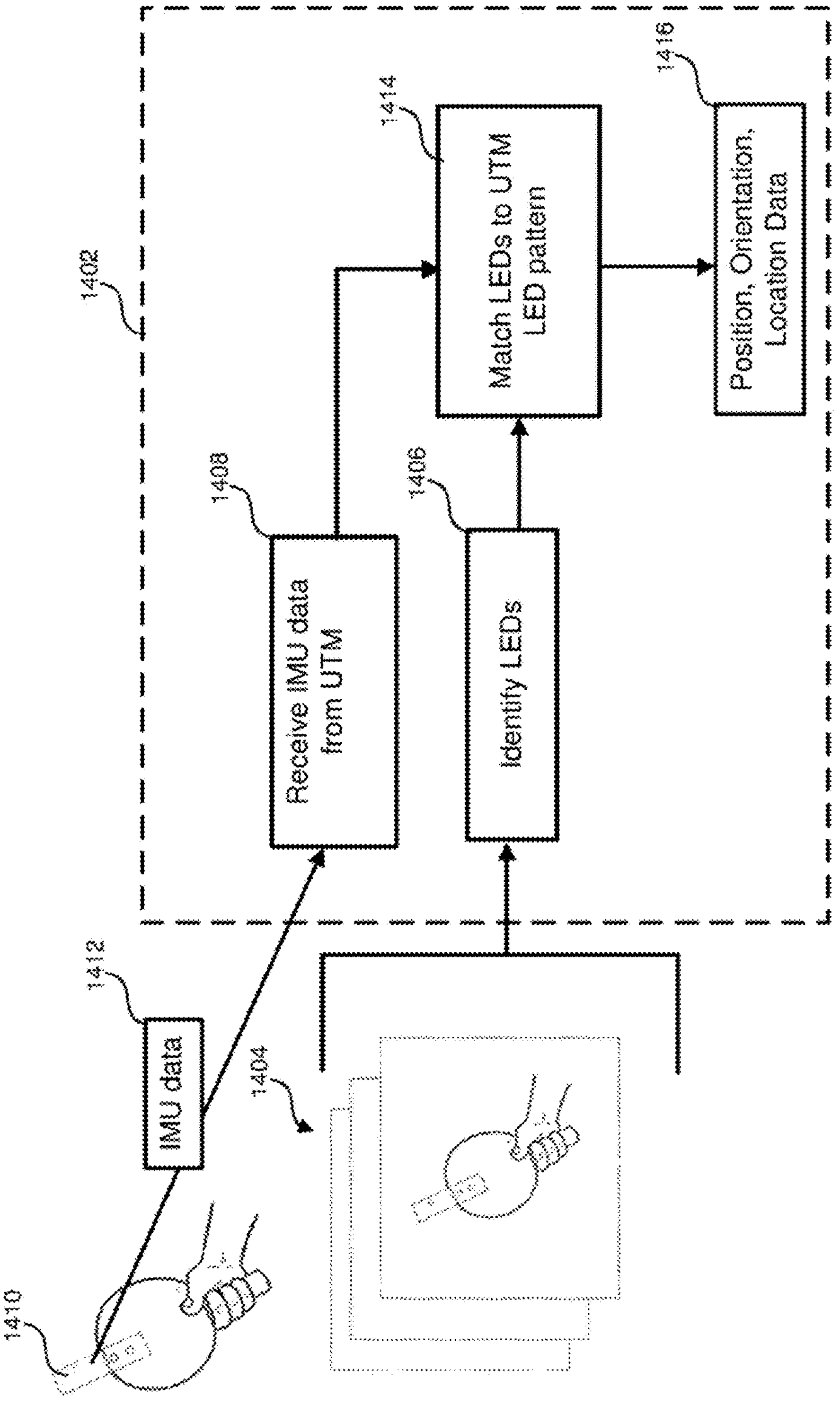
FIG. 14 is a conceptual diagram illustrating a process for obtaining position, orientation, and location data utilizing an image of a UTM in accordance with some implementations of the present technology.

FIG. 14 depicts a conceptual diagram for obtaining position, orientation, and location data utilizing an image of the UTM 1410. In examples, the HMO 1402 can obtain one or more images 1404 and utilize the image to identify one or more LEDs depicted in the image in block 1406, as previously described. In some examples, IMU data 1412 can be received at block 1408 such that, at block 1414, the IMU data can limit or restrict a subset of LED patterns utilized for matching the LEDs identified in block 1406. Accordingly, the HMO 1402 can determine the UTM's position, orientation, and location data and apply or translate the UTM's position, orientation, and location data to the object attached to the UTM. In some examples, the object attached to the UTM is associated with a three-dimensional structure. The three-dimensional structure can be a preexisting model including shape and dimension information of the object. In some implementations, the three-dimensional structure can be obtained from a manufacturer for example, or the three-dimensional structure can be created in real-time as object points and surfaces are acquired and placed in relation to one another. For example, triangulation can be used to process a relationship between multiple images, or views, of an object, such that object surface points can be extracted from each image and converted into a three-dimensional representation (e.g., three-dimensional structure). In some examples, the three-dimensional structure can be used to render the object in an XR environment.

Based on the three-dimensional structure a mathematical transformation can be applied to transform the relative position and orientation of the three-dimensional structure of the UTM to the relative position and orientation of the three-dimensional structure of the object attached to the UTM. That is, the change in position and orientation of the UTM can be mapped, via a mathematical transformation for example, to a change in the position and orientation of the object attached to the UTM to obtain position, orientation, and data 1416.

As one additional non-limiting example, a relationship between the coordinate system of the UTM and the coordinate system of the object attached to the UTM can be used to perform one or more mathematical operations to convert the position and orientation data from the coordinate system of the UTM to the coordinate system of the object attached to the UTM. In some examples, the relationship between the coordinate system can be based on a known, or preestablished, origin of the UTM (e.g., the origin of the IMU), a known location on the UTM where the object is attached (e.g., the docking interface), and a known location on the object where the UTM is attached (e.g., the object's docking interface). Thus, a change in the orientation and/or position of the UTM can be applied, or mapped, to change the orientation and/or position of the object attached to the UTM and obtain position, orientation, and data 1416. In some examples, the change in the orientation and/or position of the UTM can be based on a previously known orientation and/or position of the UTM. One or more transformation matrices, quaternions, or other mathematical representations can be used to transform the relative position and orientation of the three-dimensional structure of the UTM to the relative position and orientation of the three-dimensional structure of the object attached to the UTM.

Figure 15:
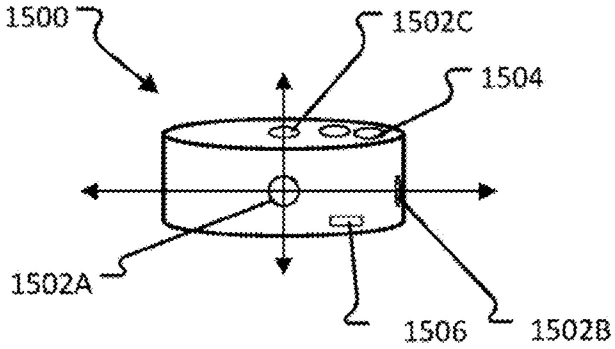
FIG. 15 depicts a conceptual diagram illustrating an Inside-out UTM used in some implementations of the present technology.

FIG. 15 depicts a conceptual diagram of an Inside-Out UTM 1500 in accordance with some implementations. The Inside-Out UTM 1500 can include a plurality of imaging devices 1502A-1502C, each located about an axis that is orthogonal to another axis about which an imaging device is located. Accordingly, the Inside-Out UTM 1500 can obtain a plurality of images of an environment, and, utilizing an environment map, determine position, orientation, and location information of the UTM 1500. For example, the UTM 1500 can include one or more tactile feedback devices, such as a button 1504, for receiving feedback or interaction information from a user and directed to the Inside-Out UTM 1500. In addition, the Inside-Out UTM 1500 can include a docking interface 1506 for docking with and/or attaching to a tracked object as further depicted in FIG. 16.

Figure 16:
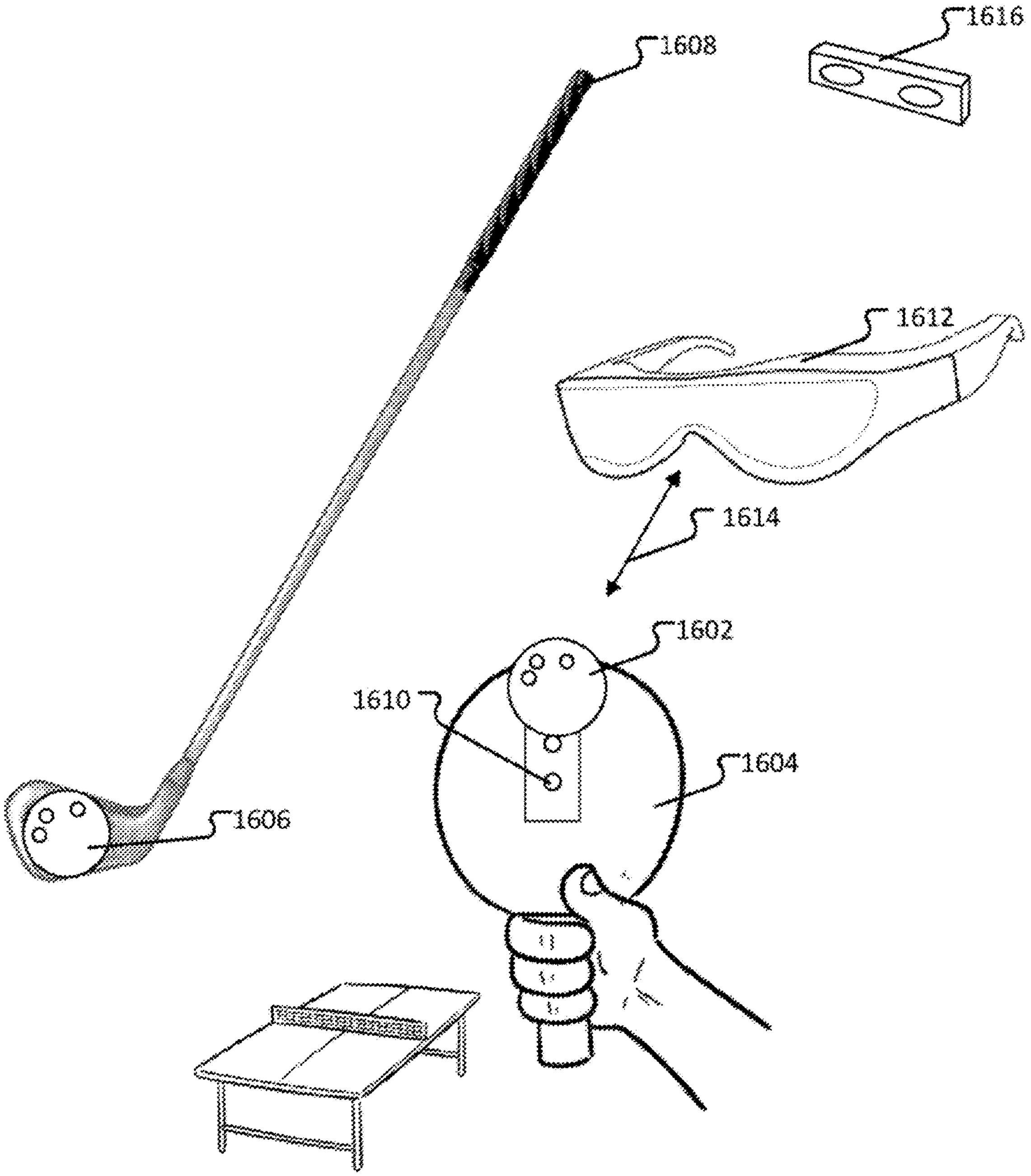
FIG. 16 is a conceptual diagram illustrating various configurations in which a UTM can be attached or mounted to an object in accordance with some implementations of the present technology.

FIG. 16 depicts a conceptual diagram of an Inside-Out UTM 1602 in accordance with some implementations. For example, the Inside-Out UTM 1602 can be docked to a table tennis paddle 1604 using a docking interface of the table tennis paddle 1604. As another example, the Inside-Out UTM 1606 can be attached to or mounted to a golf club 1608 without a docking interface. As further depicted in FIG. 16, the Inside-Out UTM 1602 can communicate with the HMO 1612 utilizing a communication pathway 1614. For example, the communication pathway 1614 can be any type of wireless communication protocol such as Bluetooth™, Wi-Fi, or other. As further depicted in FIG. 16, the table tennis paddle 1604 can include one or more interactivity buttons, such as button 1610. Buttons 1610 can allow a user to provide object configuration information to the Inside-Out UTM 1602, whereby the Inside-Out UTM 1602 can communicate such information to the HMO utilizing the communication pathway 1614. As further depicted in FIG. 16, the Inside-Out UTM 1602 can communicate with an external SLAM-based tracking system 1616 to access and/or update an environment map.

Figure 17:
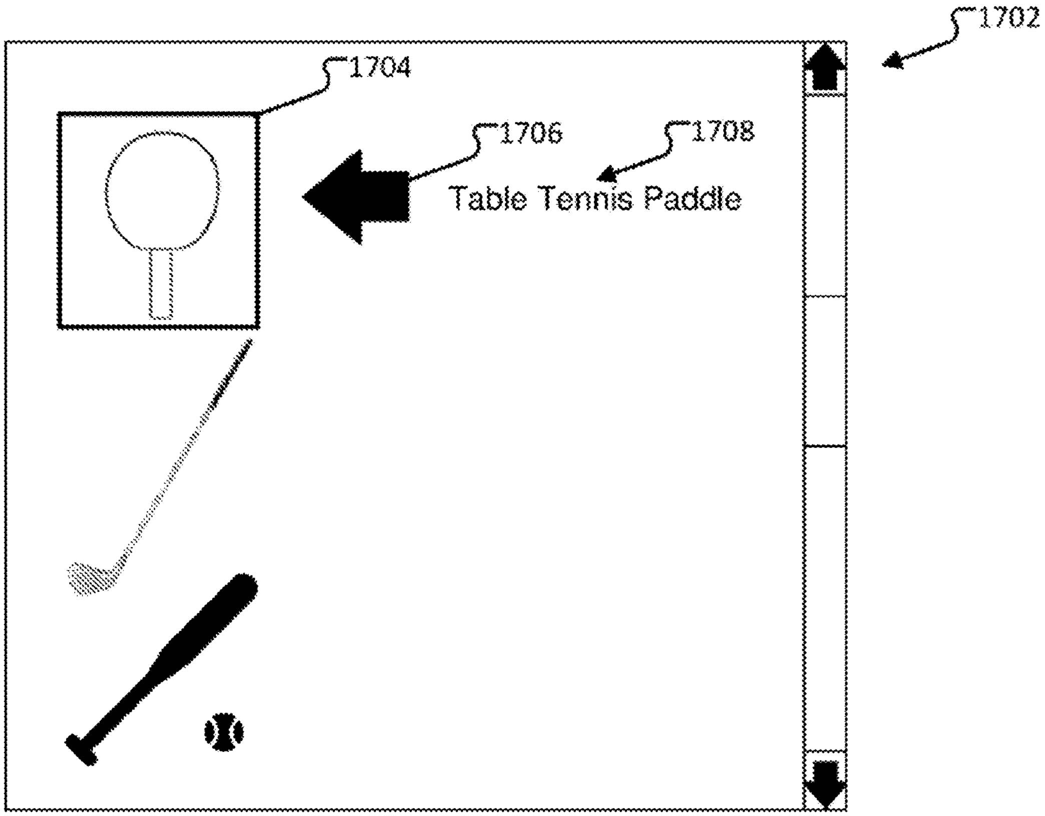
FIG. 17 is a conceptual diagram illustrating an example interface for selecting an object in accordance with some implementations of the present technology.

FIG. 17 is a conceptual diagram illustrating a selection of an object that is attached to the UTM. In some examples, the UTM can relay an identifier associated with the object attached to the UTM, where the identifier can be used to obtain additional information of the object (e.g., query a database, etc.). In some examples, the additional information can be associated with a three-dimensional structure having shape and size information (e.g., a three-dimensional model). Accordingly, when an application of the HMO is executed, the user can confirm the object attached to the HMO utilizing the interface 1702 such that the shape and size information of the object can be utilized when determining and tracking orientation and position data of the object. In examples, a plurality of objects can be presented to a user based on the object identifier communicated to the HMO via the UTM. Alternatively, or in addition, an application executing at the HMO can perform an object recognition process to identify the object attached to the UTM. Thus, a user can confirm that the object attached to the UTM is the same as the object resulting from the object recognition process. Alternatively, or in addition, where an object does not communicate with the HMO or UTM or where such object does not include an object identifier, a user can select an object to which the UTM is attached via the interface 1702. In addition to an image 1704 of the object, a selection indicator 1706 and object caption 1708 can be provided to the user.

Figure 18:
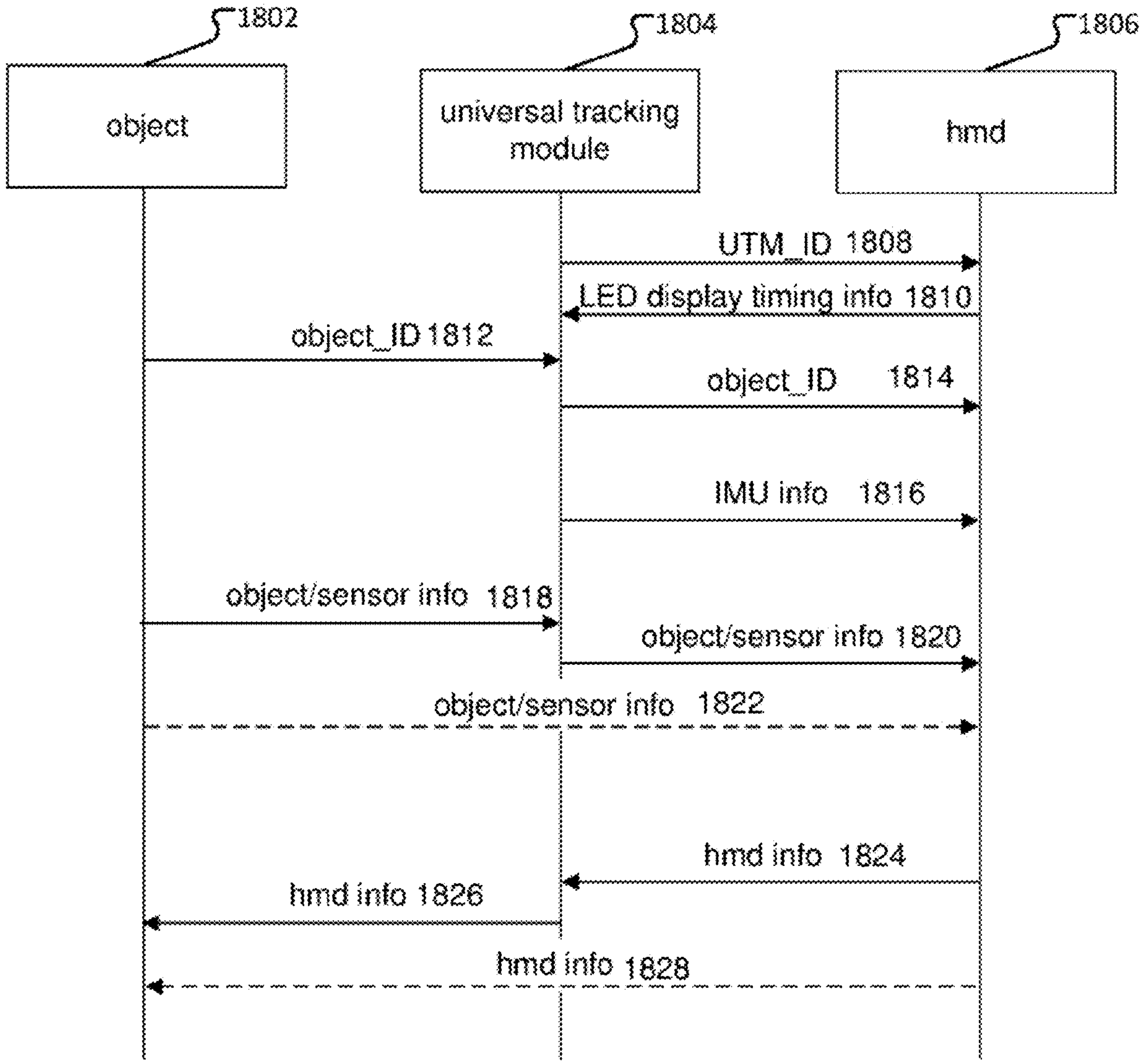
FIG. 18 is a conceptual diagram illustrating a communication flow diagram in accordance with some implementations of the present technology.

FIG. 18 depicts a communication diagram 1800 in accordance with some implementations of the present disclosure. The communication diagram 1800 generally depicts communication between an object 1802, UTM 1804, and HMO 1806. In examples, an identifier associated with the UTM 1804 can be provided to the HMO 1806 at 1808. The HMO 1806 can respond to the UTM 1804 with LED display timing information 1810. In some examples, where the object 1802 can communicate with the UTM 1804 and/or the HMO 1806, the object 1802 can provide an object identifier at 1812 to the UTM 1804 such that the UTM 1804 can provide the object identifier at 1814 to the HMO 1806. For example, the UTM 1804 can provide IMU data at 1816, where the data is specific to a point in time corresponding to when an image of one or more LEDs of the UTM 1804 are acquired by an imaging device associated with the HMO 1806.

In some examples, the object 1802 can provide object and/or sensor information at 1818, where such information can correspond to configuration and/or feedback information (e.g., from an external button). For example, the object 1802 can communicate such information directly to the HMO 1806 at 1822 or pass the information to the UTM 1804 so that the UTM can provide the information to the HMO 1806 at 1820. In some examples, the HMO 1806 can provide information, such as LED timing information or a request for IMU data, and/or cause an action to occur, such as blinking a light associated with an external interface or button, directly to the UTM 1804 at 1824 and/or the object 1802 at 1828. Alternatively, the HMO 1806 can provide the information or cause the action to occur by communicating with UTM 1804, such that the UTM 1804 can relay information to the object 1802 at 1826.

FIG. 19 is a conceptual diagram illustrating example data structures 1902, 1904, 1906, and 1908 in accordance with some implementations of the present disclosure. In examples, the data structure 1902 can include a UTM name 1910, UTM unique identifier 1912, and an LED map 1914. The data structure 1902 can be utilized for obtaining an LED map associated with the UTM. In some examples, UTMs can comprise one or more form factors; accordingly, an LED map specific to the UTM may provide accurate position, orientation, and location information when mapping identified LEDs to an LED map. The data structure 1904 can include a UTM unique identifier 1916 together with IMU data 1918. In examples, the IMU data can refer to position information, acceleration information, or other data, such as vector information representative of velocity, gravity, acceleration, etc. In examples, the data structure 1904 can be utilized when communicating IMU data from the UTM to the HMO.

As further depicted in FIG. 19, data structure 1906 can include an object name 1920 together with an object identifier 1922. The data structure 1906 can be utilized to link, or map, an object, such as a table tennis paddle, to a unique identifier 1922 such that additional object information can be retrieved. In examples, additional object information can include one or more capabilities of the object and/or how the object communicates the UTM and/or HMO. As another example, feedback information can be stored or communicated in a data structure, such as data structure 1908. The data structure 1908 depicts the object identifier 1924 and a status (e.g., button 1 depressed, button 2 up, etc.) of one or more feedback buttons 1926. In some examples, the data structures can be unique to an object, UTM, HMO, or session; in some examples the data structures can be shared between objects, UTMs, HMDs, and/or sessions.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; Band C; A, B, and C; or multiple of any item such as A and A, B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A tracking device for tracking a position and orientation of an object, the tracking device including:

a main logic board;

a light-emitting diode wrap at least partially enclosing the main logic board, wherein the light-emitting diode wrap includes a plurality of light-emitting diodes disposed on the light-emitting diode wrap;

a cover at least partially enclosing the light-emitting diode wrap, wherein one or more light-emitting diodes of the plurality of light-emitting diodes are configured to emit light through the cover in accordance with one or more blinking rates; and a docking interface configured to couple the tracking device to the object, wherein one or more of the plurality of light-emitting diodes disposed on the light-emitting diode wrap are configured to blink in accordance with a framerate of an imaging device external to the tracking device.

2. The tracking device of claim 1, wherein the main logic board includes an inertial measurement unit configured to communicate sensor data to a head-mounted display integrated with the imaging device, and wherein the inertial measurement unit is configured to provide the sensor data in accordance with a frame rate of the imaging device.

3. The tracking device of claim 2, wherein the main logic board further includes a communication interface configured to:

receive light-emitting diode configuration information from the head-mounted display, the light-emitting diode configuration information indicating the one or more blinking rates of the one or more light-emitting diodes of the plurality of light-emitting diodes; and wirelessly communicate the sensor data to the head-mounted display, wherein the sensor data is communicated to the head-mounted display in accordance with the frame rate of the imaging device.

4. The tracking device of claim 3, wherein the communication interface is configured to pass an action or a command to the head-mounted display in accordance with an activation of a tactile switch disposed on the main logic board, wherein the action or the command initiates a pairing process between the head-mounted display and the tracking device.

5. The tracking device of claim 1, wherein the docking interface is communicatively coupled to the object such that at least one of an action or command can pass from the object to the tracking device via a communication pathway.

6. The tracking device of claim 1, wherein light-emitting diodes are disposed on the light-emitting diode wrap in accordance with a pattern specific to the tracking device.

7. The tracking device of claim 1, wherein the cover limits an amount of light emitted by one or more light-emitting diodes of the plurality of light-emitting diodes in accordance with a viewing angle.

* * * * *